US009743153B2

(12) United States Patent
Holyoak

(10) Patent No.: US 9,743,153 B2
(45) Date of Patent: Aug. 22, 2017

(54) CONTENT REPLACEMENT WITH ONSCREEN DISPLAYS

(71) Applicant: Sorenson Media, Inc., Draper, UT (US)

(72) Inventor: Mitchell M. Holyoak, West Jordan, UT (US)

(73) Assignee: Sorenson Media, Inc

( * ) Notice: Subject to any disclaimer, the term of this patent is extended or adjusted under 35 U.S.C. 154(b) by 0 days.

(21) Appl. No.: 14/820,490

(22) Filed: Aug. 6, 2015

(65) Prior Publication Data

US 2016/0234564 A1 Aug. 11, 2016

Related U.S. Application Data

(60) Provisional application No. 62/049,995, filed on Sep. 12, 2014, provisional application No. 62/151,912, filed on Apr. 23, 2015.

(51) Int. Cl.
*H04N 21/81* (2011.01)
*H04N 21/234* (2011.01)
*H04N 21/2668* (2011.01)
*H04N 21/443* (2011.01)

(52) U.S. Cl.
CPC ..... *H04N 21/812* (2013.01); *H04N 21/23424* (2013.01); *H04N 21/2668* (2013.01); *H04N 21/4438* (2013.01)

(58) Field of Classification Search
None
See application file for complete search history.

(56) References Cited

U.S. PATENT DOCUMENTS

| 6,510,557 B1* | 1/2003 | Thrift ................. H04N 21/4316 348/E5.006 |
| 9,380,325 B1 | 6/2016 | Cormie et al. |
| 2006/0117343 A1 | 6/2006 | Novak et al. |
| 2006/0130095 A1 | 6/2006 | Willis et al. |

(Continued)

OTHER PUBLICATIONS

International Search Report and Written Opinion for International Patent Application No. PCT/US2016/029227, mailed Jul. 26, 2016, 10 pages.

*Primary Examiner* — Omar S Parra
(74) *Attorney, Agent, or Firm* — Honigman Miller Schwartz and Cohn LLP

(57) ABSTRACT

A method of content replacement with onscreen displays. The method can further include sending an overlay request to provide overlay content and an overlay format. The method can include receiving the overlay content and the overlay format selected in view of overlay parameters. The method can include superimposing the overlay content over the media content using the overlay format. The method can include detecting a presence of an onscreen display. The method can include determining a location of a portion of the onscreen display that extends underneath the overlay content. The method can include defining a window in the overlay content that corresponds to at least the location of the portion of the onscreen display. The method can include setting a transparency level of the overlay content in the window to permit the portion of the onscreen display to be at least partially visible through the overlay content.

20 Claims, 14 Drawing Sheets

(56) References Cited

U.S. PATENT DOCUMENTS

| | | |
|---|---|---|
| 2007/0263011 A1* | 11/2007 | Hallberg .................. G09G 5/00 |
| | | 345/629 |
| 2010/0275143 A1* | 10/2010 | Fu .......................... G09G 5/377 |
| | | 715/768 |
| 2011/0026761 A1 | 2/2011 | Radhakrishnan et al. |
| 2011/0087789 A1 | 4/2011 | Savolainen et al. |
| 2011/0247042 A1 | 10/2011 | Mallinson |
| 2011/0321084 A1 | 12/2011 | Takahashi et al. |
| 2011/0321087 A1 | 12/2011 | Huber et al. |
| 2013/0205315 A1 | 8/2013 | Sinha et al. |
| 2014/0026993 A1 | 1/2014 | Rosen et al. |
| 2014/0035965 A1 | 2/2014 | Toyomura et al. |
| 2014/0067828 A1* | 3/2014 | Archibong .......... H04L 65/4084 |
| | | 707/748 |
| 2014/0269930 A1 | 9/2014 | Robinson et al. |
| 2014/0282670 A1 | 9/2014 | Sinha et al. |
| 2014/0282723 A1 | 9/2014 | Sinha et al. |
| 2014/0289650 A1 | 9/2014 | Cotlarciuc et al. |
| 2014/0344871 A1 | 11/2014 | Martin et al. |
| 2014/0359656 A1 | 12/2014 | Banica et al. |
| 2015/0163563 A1 | 6/2015 | An et al. |
| 2015/0181311 A1 | 6/2015 | Navin et al. |

* cited by examiner

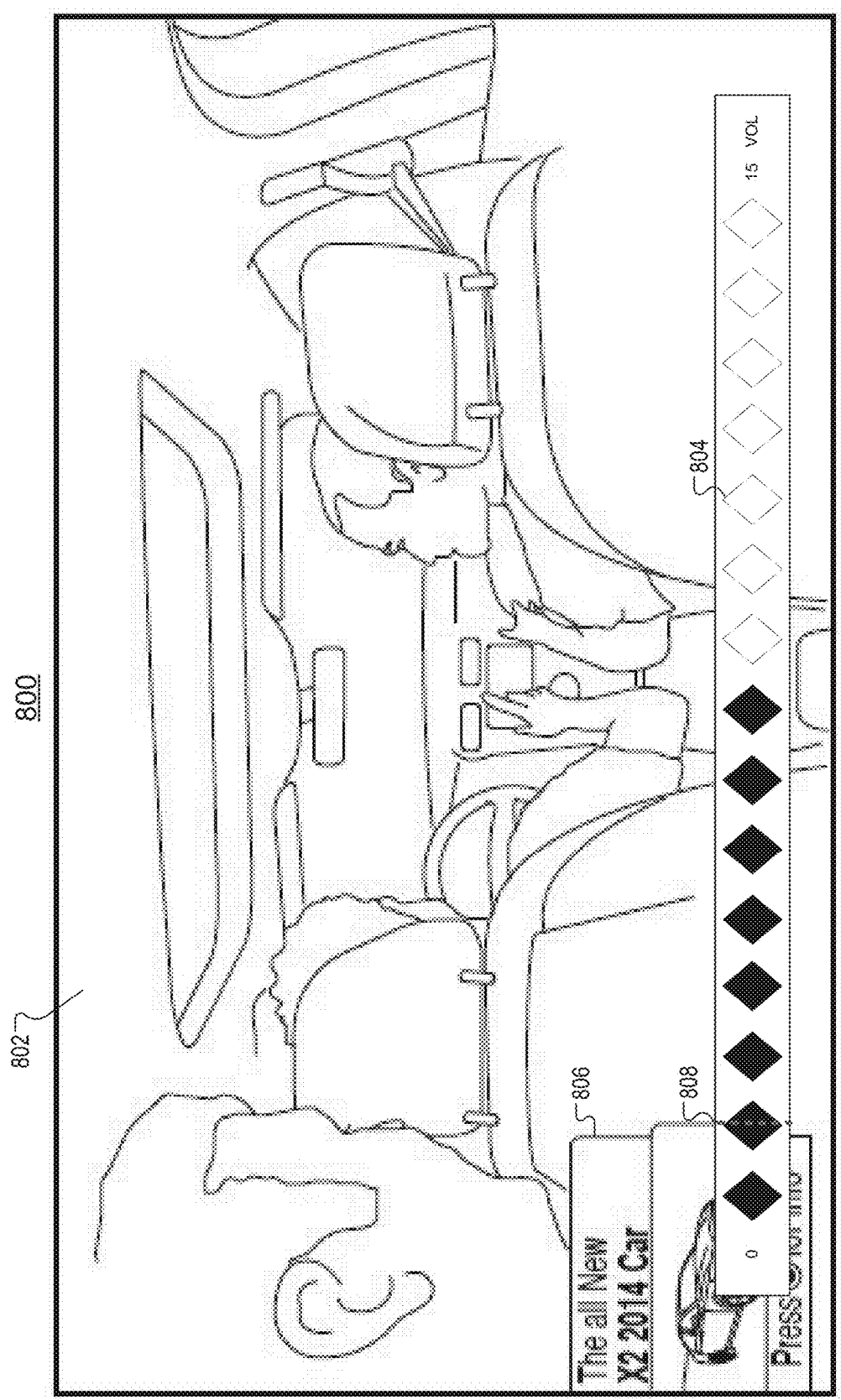

CONTENT REPLACEMENT WITH ONSCREEN DISPLAYS

RELATED APPLICATIONS

This application claims the benefit of U.S. Provisional Application No. 62/049,995, filed Sep. 12, 2014, and U.S. Provisional Application No. 62/151,912, filed Apr. 23, 2015 the entire disclosures of which is incorporated herein by reference.

BACKGROUND

Media consumption devices, such as smart televisions (TVs), can access broadcast digital content and receive data, such as streaming media, from data networks (such as the Internet). Streaming media refers to a service in which media content, such as movies or news, can be provided to an end user over a telephone line, cable, Internet, and so forth upon request. For example, a user can view a movie without having to leave their residence. Also, users can access various types of educational content, such as video lectures, without having to physically attend at a school or educational institution.

As the number of media consumption devices continues to increase, media content generation and delivery from content feeds may similarly increase. Content feeds may be generated at a central location and distributed to a variety of locations. For example, a television channel may be distributed from a content provider to a number of local broadcasters. The content feeds can include advertisements inserted by advertisers or broadcasters to promote a product or provide additional information to a group of viewers.

Advertisers and providers can rely on fixed content feeds (e.g., content that is fixed at the time of broadcasting) to promote products or provide information to all viewers. To target viewers, advertisers or broadcasters can select when the fixed content is advertised based on an audience analysis and ratings provider, such as The Nielsen Company. With an increase in use of media consumption devices (such as smartphones, tablets, and smart televisions) to access streaming media, content or network providers (such as local broadcasters, multi-channel networks, and other content owners/distributors) can distribute contextually-relevant material to viewers that are consuming streaming media.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 8 illustrates an expanding overlay format for an overlay content superimposed on a media content according to one embodiment.

DETAILED DESCRIPTION

Figure 1:
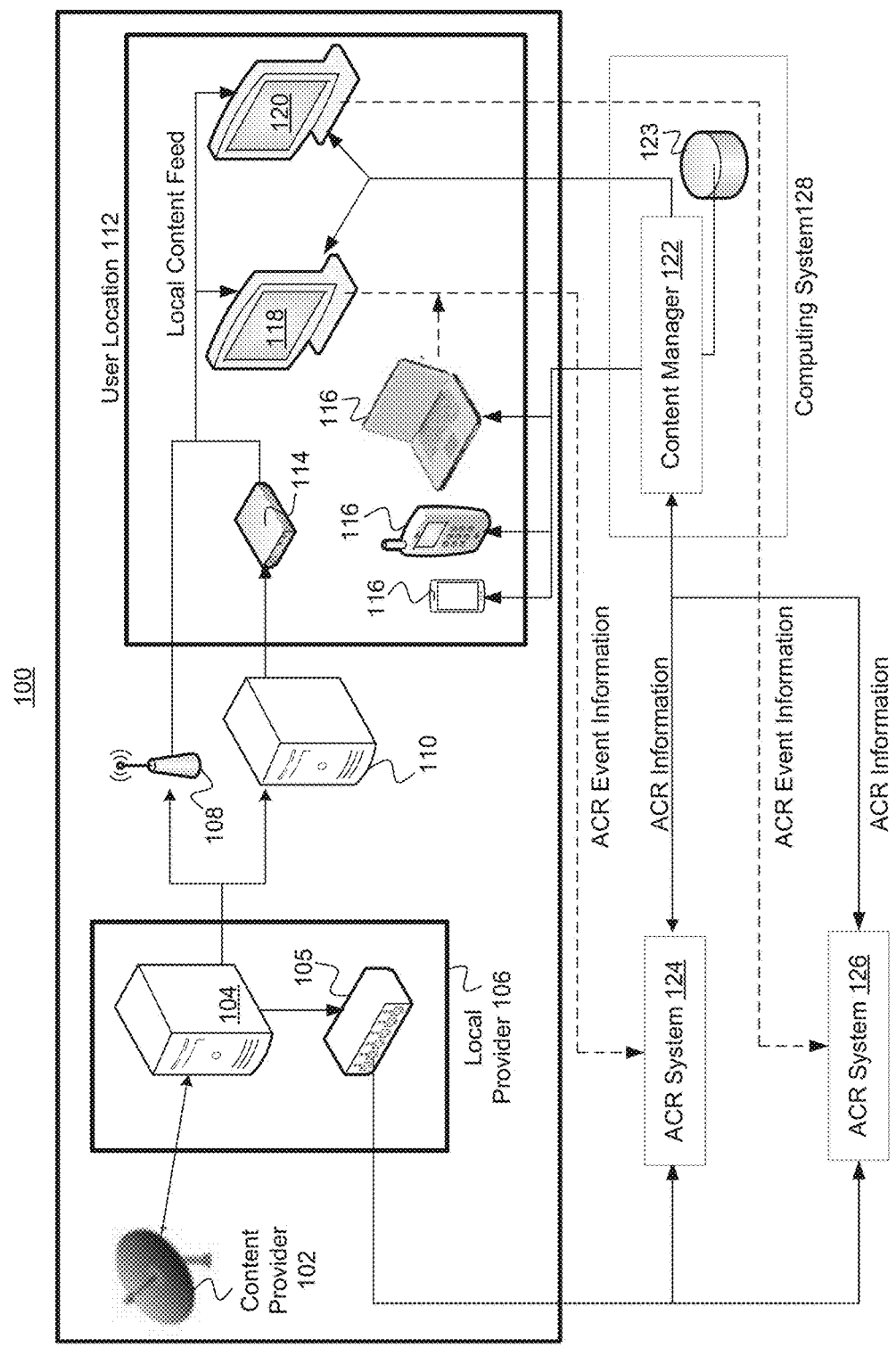
FIG. 1 illustrates a system diagram of a content distribution network according to one embodiment.

Broadcast television provides the same content to all viewers. Advertisers can integrate commercials in broadcast television prior to a signal being broadcast to a viewer. While advertising can be an engaging venue to advertise products or services, traditional media consumption advertising lacks targeted and personalized advertising. To increase an impact and effectiveness of the advertisement, an advertiser may be interested in targeting particular advertisements to particular sets of viewers, such as a viewer of a selected demographic or location.

Media consumption devices can receive content with material (e.g., contextually-relevant material) that can provide viewers with targeted or personalized advertising as well as an interactive viewing experience. The material can be overlayed or superimposed over the broadcast content or media content (e.g., overlay content) to provide viewing content that is more relevant to a viewer. However, when a viewer accesses an onscreen display for the media consumption device or other devices coupled to the media consumption device (such as a stereo receiver or a cable box that displays information on the media consumption device) the overlayed content can interfere with the onscreen display. In one example, the onscreen display can be a setting of the media consumption device or other devices, such as a volume level indicator. In another example, the onscreen display can be a menu of the media consumption device or other devices, such as a device controls menu. Traditionally, when the overlay content is superimposed over the broadcast content, the onscreen displays may be not be properly displayed, e.g., obscured or covered up.

The embodiments described herein are methods, systems, and devices for displaying broadcast media content with superimposed overlay content while not obscuring an onscreen display positioned between the media content and the overlay content. A processing device of the client device can detect appearance of an onscreen display and adjust an overlay of the overlay content to avoid obscuring an area where the onscreen display may be located on a display screen of the media consumption device. For example, the processing device may determine a shape and a location of a portion of the onscreen display that extends underneath the overlay content and generate an opacity window of that size within the overlay content. The processing device may adjust levels of transparency of the opacity window to allow varying degrees of ability to view the onscreen display through the overlay content. An advantage of not obscuring an onscreen display while displaying the targeted video content can be that content providers can have targeted overlay content displayed to a user while users can continue to access onscreen displays.

The word "content" can be used to refer to media or multimedia. The word "content" can also be a specific term that means the subject matter of the medium rather than the medium itself. Likewise, the word "media" and some compound words that include "media" (e.g. multimedia, hypermedia) are instead referring to content, rather than to the channel through which the information is delivered to the end user/audience. Media or media content can include graphical representations, such as: videos, such as films, TV shows, commercials, streaming video, and so forth; text; graphics; animations; still images; interactivity content forms; and so forth. An example of a type of content commonly referred to as a type of media is a "motion picture" referred to as "a film."

FIG. 1 illustrates a system diagram of a content distribution and viewing data aggregation network 100 according to one example. In the content distribution and viewing data aggregation network 100, a content provider 102 can broadcast a content feed to a local provider 106. The local provider 106 can include a headend 104 and an automatic content recognition (ACR) fingerprinter server 105. The content feed from the content provider 102 can be received at the headend 104 of the local provider 106. The headend 104 can generate a local content feed based on the received content feed. For example, the headend 104 can be a local affiliate broadcaster receiving a network channel with programming and advertisements from a national or global broadcaster.

The headend 104 can communicate the local content feed to the ACR fingerprinter server 105, an over-the-air (OTA) broadcaster 108, a multichannel video programming distributor (MVPD) 110, or a combination thereof. The OTA broadcaster 108 or the MVPD 110 can communicate the local content feed to a media device. Some examples of media devices can include client devices 118 and 120, a set top box 114 that streams provider content to the client devices 118 and 120, as well as other devices 116 through which the user can stream the local content feed, e.g., wirelessly.

In one example, the OTA broadcaster 108 can broadcast the local content feed using traditional local television or radio channels. In this example, the client devices 118 and 120 can include antennas (such as TV or radio antennas) and receive the local content feed. In another example, the MVPD 110 (such as cable or satellite broadcaster) can communicate the local content feed to a set top box device 114. In this example, the set top box device 114 can format the content feed for the client devices 118 and 120 and can communicate the formatted content feed to the client devices 118 and 120. The client devices 118 and 120 can include a display device, such as a television screen or a touch screen, to display the local content to a viewer. Various components of the content distribution and viewing data aggregation network 100 can be integrated or coupled to the client devices 118 and 120. For example, a smart television can include the antennas, the set-top box device 114, and a display device in a single unit.

The ACR fingerprint server 105 can analyze the local content feed and determine fingerprint information (e.g., fingerprints). The ACR fingerprint server 105 can communicate the fingerprints to ACR system 124, ACR system 126, or a combination thereof. The ACR systems 124 and 126 can be different ACR systems selected by device manufacturers that may employ different ACR technologies, such as smart TV manufacturers.

The ACR fingerprint server 105 can analyze the local content feed and capture fingerprints, which can include an ordered sequence of frames from the local content feed. The ACR fingerprint server 105 can communicate the fingerprints to the ACR systems 124, ACR system 126, or a combination thereof. The ACR systems 124 and 126 can be different ACR systems selected by device manufacturers, such as smart TV manufacturers. In one example, the ACR fingerprint server 105 can format fingerprints for the different ACR systems 124 and 126. The ACR systems 124 and 126 can establish communication connections with the different client devices 118 and 120, respectively. The client devices 118 and 120 can communicate fingerprint information to the ACR systems 124 and 126, respectively. When the ACR system 124 or 126 receives fingerprint information from the client device 118, the client device 120, or both, the ACR system 124 or 126 can match the received fingerprints with those generated by the ACR fingerprint server 105. When a match occurs and the content has been identified, the ACR system 124 or 126 can communicate ACR events to a computing system 128. The ACR events can include: the client device 118 or 120 turning on, the client device 118 or 120 turning off, media content starting to be displayed on the client device 118 or 120, ending displaying the media content on the client device 118 or 120, the client device showing a startup screen (such as an Xbox® startup screen, Netflix® startup screen, or a Comcast® startup screen), a commercial starting to be displayed on the client device 118 or 120, ending displaying the commercial on the client device 118 or 120, changing a channel on the client device 118 or 120, or the client device 118 or 120 experiencing an unexpected occlusion. The computing system can include a content manager 122 and a database 123.

In another example, the ACR system 124 or 126 can receive fingerprint information from the client device 118 or 120 and can match the received fingerprints with those generated by the ACR fingerprint server 105. When a match occurs and the content has been identified, the ACR system 124 or 126 can notify the client device 118 or 120 of the ACR events and then the client device 118 or 120 can communicate those ACR events to a content manager 122. Alternatively, or additionally, the ACR system 124 or 126 can directly communicate the ACR events to the content manager 122. The fingerprint information can include: a display of advertisements in the local content feed to a viewer, a display of selected or flagged content in the local content feed to a viewer, a change of content channel at the client device 118 or 120, and so forth.

The event information from the different ACR systems 124 and 126 can be in different formats or orders and the content manager 122 can normalize the data into a common format before storing the data into a database stored at or across a network from the ACR system 124 or 126. For example, the content manager 122 can receive disparate data sets from the ACR systems 124 and 126 that include similar but not identical data, such as data with the same content but formatted differently. The content manager 122 can process and reformat the disparate data sets to create a single data model or format (e.g., reformatted data sets) and the reformatted data sets can be populated into a database 123 in the content manager 122.

In one embodiment, to normalize disparate data sets from ACR systems 124 and 126, the content manager 122 can cleanse or filter data in the data sets. For example, some data sets can contain fields or data that can be irrelevant to the content manager 122. In this example, the content manager 122 can cleanse or filter the irrelevant data (e.g., the data can be removed or ignored). In another example, some data sets can include instances of incomplete or incorrect data or data sets and the content manager 122 can cleanse or filter the incomplete or incorrect data or data sets. In another embodiment, to normalize the disparate data sets from ACR systems 124 and 126, the content manager 122 can map fields of the data sets. For example, when the content manager 122 receives a first data set from the ACR system 124 and a second data set from the ACR system 126, at least some of the data fields of the first data set and the second data set can be common to both the first and second data set. However, the common data fields can be located at different places in the first and second data sets. In this example, the content manager 122 can map the different data fields of the first and second data sets to normalized fields and have the same data fields in the same data field locations in the database 123. The content manager 122 can reorder common data field locations of the first viewing data and the second viewing data same data fields to the single data model (e.g., a single data format).

In another embodiment, to normalize disparate data sets from the ACR systems 124 and 126, the content manager 122 can derive data from the data sets. For example, data from the ACR system 124 or 126 may not contain all of the fields that are needed to fill the data fields in the database. However, the content manager 122 can use other fields in the data sets from the ACR systems 124 and 126 to derive data for these data fields.

In one example, the database 123 can include data fields for such as a state in a country field, a designated market area (DMA), and a county field or city field but the data sets from the ACR systems 124 and 126 may only include zone improvement plan (ZIP) codes. In this example, the content manager 122 can use the ZIP codes to derive data for the fields in the database. In another example, the data set may not contain any geographic location information, but can include an internet protocol (IP) address of the client device 118 or 120. In this example, the content manager 122 can use a geo-IP lookup service to derive the state, DMA, county, city and ZIP code information.

In another example, the database 123 can include demographic fields such as an age field, a gender field, a household income field, and so forth. However, the data sets from the ACR systems 124 and 126 may not include the demographic fields or demographic data. In this example, the ACR systems 124 and 126 can provide the content manager 122 with the IP address of the client devices 118 and 120. The content manager 122 can use the IP addresses to determine the demographic data to populate the data fields in the database. In another example, the ACR systems 124 or 126 can provide the IP addresses to a third party that can match the IP addresses to demographic data. The third party can then provide the matched demographic data to the content manager 122, thereby avoiding the content manager 122 knowing the IP addresses.

In another example, a field in a first data set from the ACR system 124 can include local time zone information, such as a mountain daylight time (MDT) zone, and a second data set from the ACR system 126 can include information from another time zone, such as a coordinated universal time (UTC) zone. The database can store all data using the UTC and the content manager 122 can convert the local time to UTC before storing the data in the database 123.

In one embodiment, the content manager 122 can use the normalized data to generate reports or data (viewing data) about user viewing behavior across different ACR technology vendors and smart TV or other Internet-connected video devices. The content manager 122 and the client devices 118 and 120 can include communications interfaces to communicate information, such as overlay content, between the client devices 118 and 120 and the content manager 122. In one example, the communication interface can communicate the information using a cellular network, a wireless network, or a combination thereof. In one example, the communications network can be a cellular network employing a third generation partnership project (3GPP) release 8, 9, 10, 11, or 12 or Institute of Electronics and Electrical Engineers (IEEE) 802.16p, 802.16n, 802.16m-2011, 802.16h-2010, 802.16j-2009, 802.16-2009. In another embodiment, the communications network can be a wireless network (such as a network using the Wi-Fi® technology developed by the Wi-Fi Alliance) that can follow an IEEE® standard developed by the Institute of Electrical and Electronics Engineers, Inc., such as the IEEE 802.11-2012, IEEE 802.11ac, or IEEE 802.11ad standards. In another embodiment, the communications network can be a Bluetooth® connection developed by Bluetooth Special Interest Group (SIG) such as Bluetooth v1.0, Bluetooth v2.0, Bluetooth v3.0, or Bluetooth v4.0. In another embodiment, the communications network can be a Zigbee® connection developed by the ZigBee Alliance such as IEEE 802.15.4-2003 (Zigbee 2003), IEEE 802.15.4-2006 (Zigbee 2006), IEEE 802.15.4-2007 (Zigbee Pro).

In one example, the content manager 122 can also instruct the client device 118 or 120 to replace portions of the local content feed received from the OTA broadcaster 108 or the MVPD 110 with overlay content. In another example, the content manager 122 can instruct the client device 118 or 120 to overlay or superimpose overlay content onto portions of the local content feed. The content manager 122 can aggregate ACR information across multiple ACR systems 124 and 126 and can communicate overlay content to different client devices 118 and 120. The client devices 118 and 120 can be from different device manufacturers.

The content manager 122 can also establish communication connections with other devices 116. In one example, the other device 116 can communicate with the client device 118 or 120 and provide an additional screen (e.g., a second screen) to display overlay content. For example, the client devices 118 and 120 can receive the local content feed from the OTA broadcaster 108 or the MVPD 110 and display the local content feed to the user. The other devices 116 can also communicate ACR event information to the ACR systems 124 and 126 when an ACR event occurs, as discussed in the preceding paragraphs. When the content manager 122 receives the ACR event information, the content manager 122 can communicate overlay content to the other devices 116.

In one example, the client devices 118 and 120 can continue to display the local content feed while the other devices 116 display the overlay content. In another example, the client devices 118 and 120 and the other devices 116 can both display the overlay content. In another example, the client devices 118 and 120 and the other devices 116 can display a portion of the overlay content and a portion of the local content feed. In another example, the client devices 118 and 120 and the other devices 116 can display different local content feeds, overlay content, or a combination thereof.

In one example, the client devices 118 and 120, the other devices 116, or a combination thereof, can display the overlay content at the time the overlay content is received. In another example, the client devices 118 and 120 and the other devices 116 can both display the overlay content. In another example, the client devices 118 and 120 and the other devices 116 can display a portion of the overlay content and a portion of the local content feed. The threshold period of time can be a predefined period of time or the content manager 122 can select a period of time for the client devices 118 and 120, the other devices 116, or a combination thereof, to delay displaying the overlay content.

Figure 2:
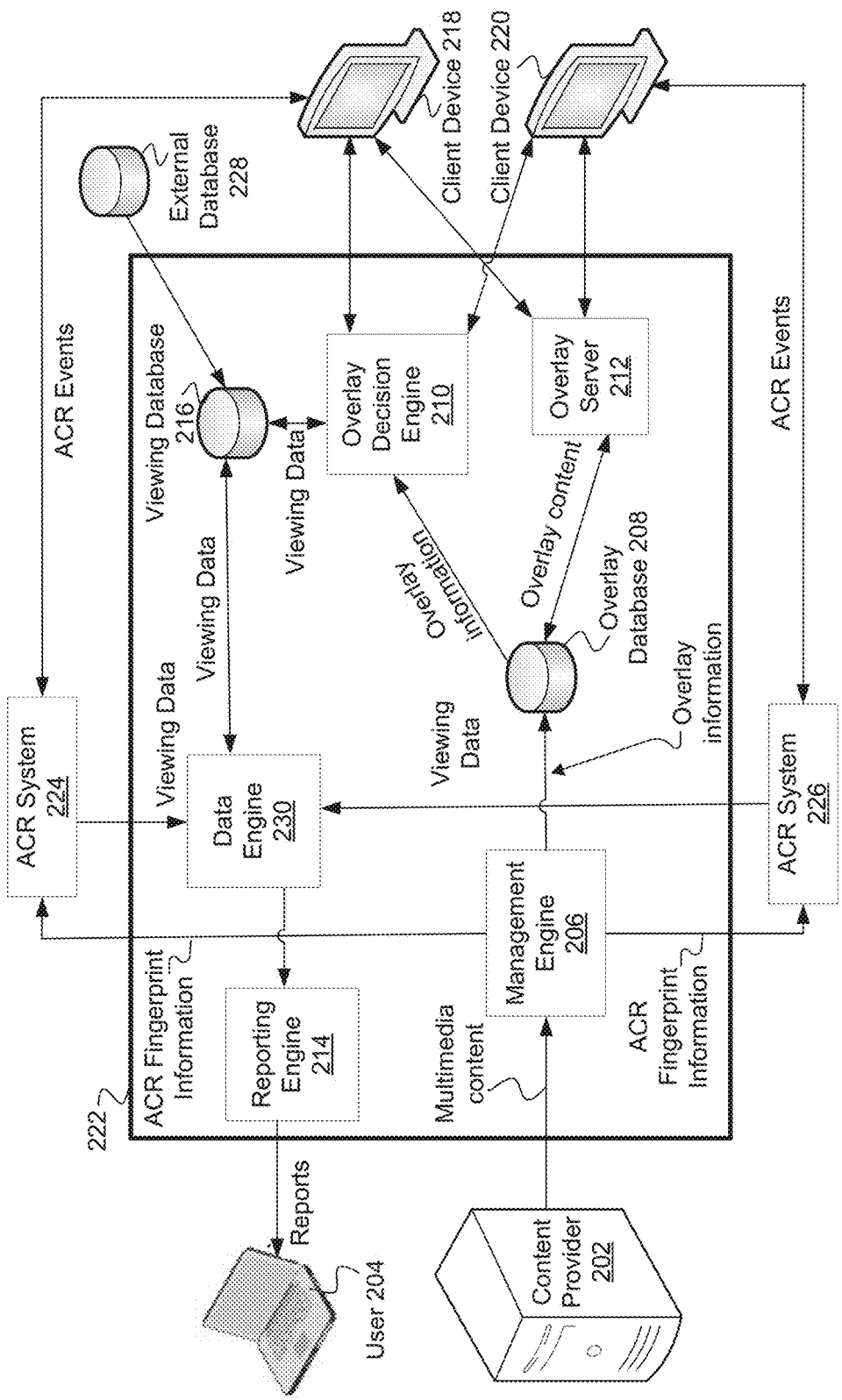
FIG. 2 illustrates a content manager to provide overlay content to a client device according to one embodiment.

FIG. 2 illustrates a content manager 222 to provide overlay content to, and collect viewing data from, client device 218 or 220 according to one embodiment. The content manager 222 can include a management engine 206, an overlay database 208, an overlay decision engine 210, an overlay server 212, a reporting engine 214, a viewing database 216, and a data engine 230. A content provider 202 can upload media content to the management engine 206. A content provider 202 can also inform the management engine of media to be overlaid using a third party show identification (ID) such as Gracenotes® Tribune Media Services (TMS) ID. In one embodiment, the management engine 206 can communicate the media content to an ACR system 224 or 226 and the ACR system 224 or 226 can produce its own fingerprint information. In another embodiment the management engine 206 can process the media content to produce fingerprints in the appropriate formats for the ACR systems 224 and 226 and communicate the fingerprints to the appropriate ACR system 224 or 226. Each ACR system 224 and 226 can use different formats for fingerprints.

In another example, fingerprints can be generated by fingerprinting every frame of a feed, every other frame of the feed, and so forth. For example, the ACR system 224 can generate a fingerprint for a frame of the feed by performing a discrete cosine transform (DCT) of the frame and designating a subset of the resulting coefficients (e.g., the low-frequency coefficients) as the fingerprint. The client devices 218 and 220 can communicate fingerprint information to their respective ACR System 224 and 226. Each fingerprint of a segment of the feed can be associated with a time index. The time index can be a time stamp when the segment of the feed was received by the ACR system 224 or 226. Alternatively, the time index can be a number of frames in the feed from an arbitrary starting point.

The management engine 206 can also receive overlay information from the content provider 202, where the overlay information can include overlay content and targeting information. The management engine 206 can store the overlay information, including the overlay content or a reference to the overlay content, in the overlay database 208. The overlay database 208 may be a single database or multiple databases. For example, the targeting information may be stored in one database and the overlay content may be stored in another database. The ACR systems 224 and 226 can communicate to the client devices 218 and 220, respectively, ACR event information and broadcast content, where the ACR event information can indicate when to trigger overlaying of content.

The client devices 218 and 220 can monitor the broadcast content and can send event information or fingerprint information to the ACR systems 224 and 226. The event information or fingerprint information can indicate when an ACR event occurs. On the detection of an ACR event, the client devices 218 and 220 can send a request for an overlay to the overlay decision engine 210. The overlay decision engine 210 can use targeting information retrieved from the overlay database 208 to determine the most suitable overlay and deliver appropriate overlay information, including information about the overlay server 212 to request the overlay from the client devices 218 and 220. The client devices 218 and 220 can use the overlay information to request the appropriate overlay content from the overlay server 212. Upon request by the client devices 218 and 220, the overlay server can provide the client devices 218 and 220 with the overlay content and the client devices 218 and 220 can display the overlay content.

The client device 218 or 220 can send a request to an overlay decision engine 210 requesting a media content overlay. In one example, the request can include a media content identifier (ID). In another example, the request can include overlay information or overlay parameters (as discussed in the proceeding paragraphs). In one example, the overlay decision engine 210 can use the content ID, the overlay information, the overlay parameters, or a combination thereof to identify targeted overlay content. In another example, the overlay decision engine 210 can use the content ID, overlay information, overlay parameters, or a combination thereof to identify an overlay format (as discussed in the proceeding paragraphs). The overlay decision engine 210 can compare the content ID, overlay information, overlay parameters, or a combination thereof with an overlay database 208 to identify the targeted overlay content and the overlay format.

In one example, the overlay database 208 can be updated, by the content provider 202 or an advertiser, with new overlay content on a periodic or continuous basis. In one example, the overlay database 208 can be updated, by the content provider 202 or an advertiser, with overlay formats on a periodic or continuous basis. When the overlay decision engine 210 identifies the targeted overlay content, the overlay decision engine 210 can return targeted overlay information to the client device 218 or 220, including reference information that references the overlay server 212. The reference information can include information identifying a location of a content overlay at the overlay server 212 and information local to the client device 218 or 220. The client device 218 or 220 send the reference information to the overlay server 212 and the overlay server 212 can identify and send the targeted overlay content to the client device 218 or 220.

In one embodiment, the overlay server 212 can deliver the format information to the client device 218 or 220 independent of the overlay content. In this embodiment, the client device 218 or 220 can receive the overlay content and format the overlay content using the format information, such as populating a template already positioned as an overlay on top of the media content, for example. In another embodiment, the overlay server 212 can format the overlay content using the format information and deliver formatted overlay content to the client device 218 or 220 as a combined package of template and overlay content to directly be displayed over the media content. In another embodiment, the overlay server 212 can use the reference information to dynamically deliver localized or tailored messages to the client devices 218 or 220.

In one example, the overlay server 212 can deliver the targeted overlay content directly to the client device 218 or 220, such as via a wireless communications network. In another example, the overlay server 212 can communicate the targeted overlay content to the client device 218 or 220 via a universal resource locator (URL). The management engine 206 can associate the overlay content or the overlay format with the URL, where the URL can indicate a source location of the overlay content and the format of the overlay. The overlay decision engine 210 can communicate the URL to the client device 218 or 220 and the client device 218 or 220 can retrieve the overlay content or the overlay format from that URL.

In one example, when multiple targeted overlay contents match the content ID, the overlay information, the overlay parameters, or a combination thereof, the overlay decision engine 210 can select the targeted content overlay that meets a greatest number of parameters and information. In another example, when multiple targeted overlay contents match the content ID, the overlay information, the overlay parameters, or a combination thereof, the overlay decision engine 210 can randomly select an overlay content that meets the parameters or the other information. In another example, when multiple targeted overlay contents match the content ID, the overlay information, the overlay parameters, or a combination thereof, the overlay decision engine 210 can select predetermined overlay content that matches other content ID, overlay information, or overlay parameters. The overlay content can be populated with dynamic content (e.g., content that can be updated or refreshed at periodic intervals).

The client devices 218 and 220 can superimpose overlay content over the content feed when stored frame fingerprints match a client fingerprint, e.g., a sequence of frames having corresponding time stamps. In one example, the client devices 218 and 220 can superimpose overlay content over the content feed in a hypertext markup language (HTML) browser. In another example, the client devices 218 and/or 220 can superimpose alternative video over the content feed. In another example, the client devices 218 and 220 can superimpose overlay content over a content feed from an OTA broadcaster or a cable broadcaster. When the overlay content is placed over the content feed, the overlay content can be displayed to the user via a display of the client devices 218 and 220. In one example, the overlay content can include one or more call to actions options that can be displayed to a user. In this example, the user can interact with the overlay content using an input device (such as a TV remote, keyboard, a smartphone, or a tablet) to create feedback information. Another individual, such as an advertiser, can access the feedback information and analyze the feedback information to determine desired information, such as user interest in the overlay content.

In one example, the client devices 218 and 220 can monitor the content feed to determine when the overlay content and content feed match ceases. In another example, the client devices 218 and 220 can monitor the content feed to determine when a threshold period of time expires. In one example, when the threshold period of time expires, the client device 218 or 220 can cease to superimpose the overlay content for display on the client device 218 or 220.

In one example, the overlay decision engine 210 can also analyze the event information to determine viewing data. The viewing data can include: channel information indicating what media content the first client device or the second client device can have displayed; duration information indicating a period of time the first client device or the second client device displayed the media content; or user command information specifying a command received from a user device. The overlay decision engine 210 can store the viewing data in the viewing database 216. In one example, the viewing database can receive information from the client device 218 or 220 via the overlay decision engine 210. In another example, the viewing database can also receive information from the ACR system 224 or the ACR system 226 via the data engine 230. The ACR systems 224 and 226 can communicate data regarding what client devices 218 and 220 have displayed to the data engine 230. The data engine can store the viewing data in the viewing database 216. The viewing data in the viewing database 216 can also be augmented with additional data from a third party external database 228. For example, the viewing data in the viewing database 216 can be matched with a demographic database from a third party to augment the viewing data in the viewing database 216 with demographic data.

In one example, the overlay decision engine 210 can receive user interaction information from the client device 218 or 220. The user interaction information can include information indicating how a user interacts with the client devices 218 and 220, such as pausing a program, changing a TV channel, muting the client devices 218 and 220, and so forth. In another example, the overlay decision engine 210 can receive user feedback information from the client device 218 or 220. The user feedback information can include user input information indicating a user reaction to a content overlay, such as content overlay like or dislike information or a request for additional information for a product or service shown in a content overlay. The overlay decision engine 210 can store the user interaction information or user feedback information in the viewing database 216.

The ACR systems 224 and 226 can provide viewing data in different formats and via different communication schemes including, but not limited to: direct beaconing of each individual viewing event; direct beaconing of batched viewing events; file based transfer of batched viewing events, such as file transfer protocol (FTP), secure FTP (SFTP), or Amazon simple storage service (Amazon S3®); or other file transfer protocol. The data engine 230 can normalize the viewing data that is received in different formats from the different ACR systems 224 and 226. The data engine 230 can store the normalized viewing data in the viewing database 216. The reporting engine 214 can query the data engine 230 to retrieve subsets of data from the viewing database 216. The reporting engine 214 can process and analyze subsets of viewing data to create reports about content viewing behavior across client devices 218 and 220 and from ACR technology vendors associated with the client devices 218 and 220.

In one example, the data engine 230 can receive viewing data from the ACR system 224, the ACR system 226, or a combination thereof, normalize the viewing data and store it in the viewing database 216. In another example, the data engine 230 can retrieve viewing data from the viewing database 216. The data engine 230 can send the viewing data to the reporting engine 214. The reporting engine 214 can aggregate the viewing data and can create reports based on the aggregated viewing data to send to a user device 204.

Figure 3:
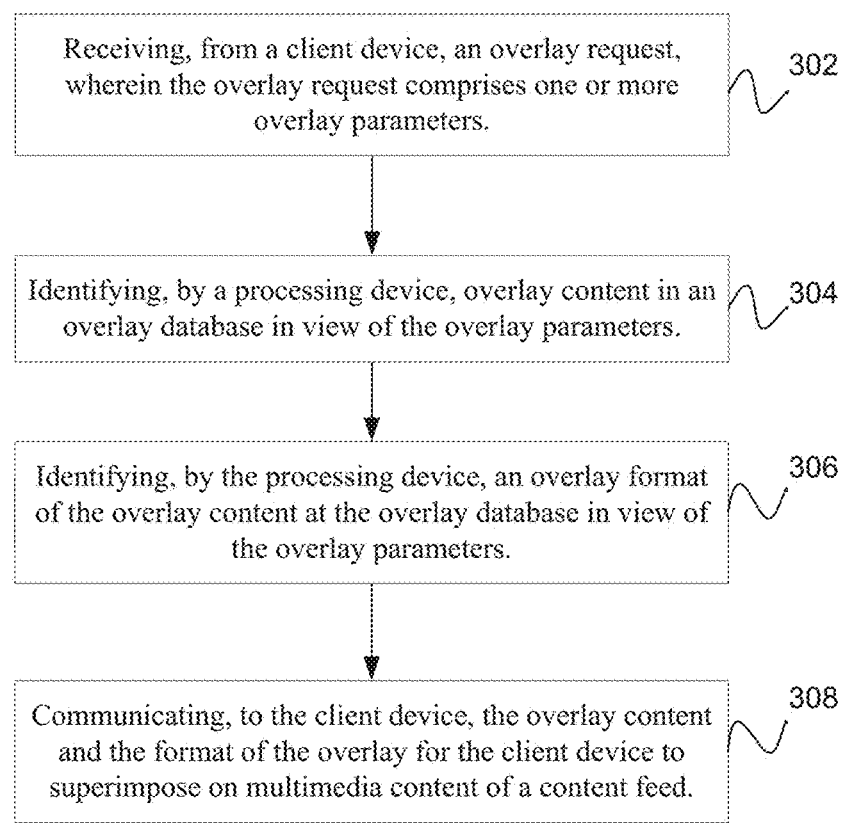
FIG. 3 illustrates a flowchart of a method for enhancing a content feed according to one embodiment.

FIG. 3 illustrates a diagram 300 of a method of the content manager providing an overlay to a client device according to one embodiment. The method 300 may be at least partially performed by processing logic that may include hardware (e.g., circuitry, dedicated logic, programmable logic, microcode, etc.), software (e.g., instructions executed by a processing device), firmware or a combination thereof. The method 300 may be performed by processing logic of the content manager 122 or the computing system 128 of FIG. 1.

FIG. 3 illustrates a flowchart 300 of a method for enhancing a content feed according to one embodiment. The method can begin with receiving, from a client device, an overlay request, wherein the overlay request comprises one or more overlay parameters (302). The method can further include identifying, by a processing device, overlay content in an overlay database in view of the overlay parameters (304). The method can further include identifying, by the processing device, an overlay format of the overlay content at the overlay database in view of the overlay parameters (306). The method can further include communicating, to the client device, the overlay content and the format of the overlay for the client device to superimpose on media content of a content feed (308).

In one embodiment, for the onscreen display to be viewable through the overlay content, the processing device can recognize that the onscreen display is superimposed over the media content or integrated into the media content and determines a size and location of the onscreen display on the broadcast video content. The processing device or an application running on the processing device can dynamically modify an alpha channel of at least a portion of the overlay content to allow the onscreen display on the media content to be viewable. The alpha channel can be used to define the opacity of each pixel of the overlay content. The alpha channel can be adjusted to range from fully transparent to completely opaque. In one example, the alpha channel can be adjusted to be fully transparent in the location where the onscreen display is located. An advantage of a viewable onscreen display through the overlay content can be to have the onscreen display viewable to a user while still allowing the overlay content to be displayed around the menu.

Figure 4:
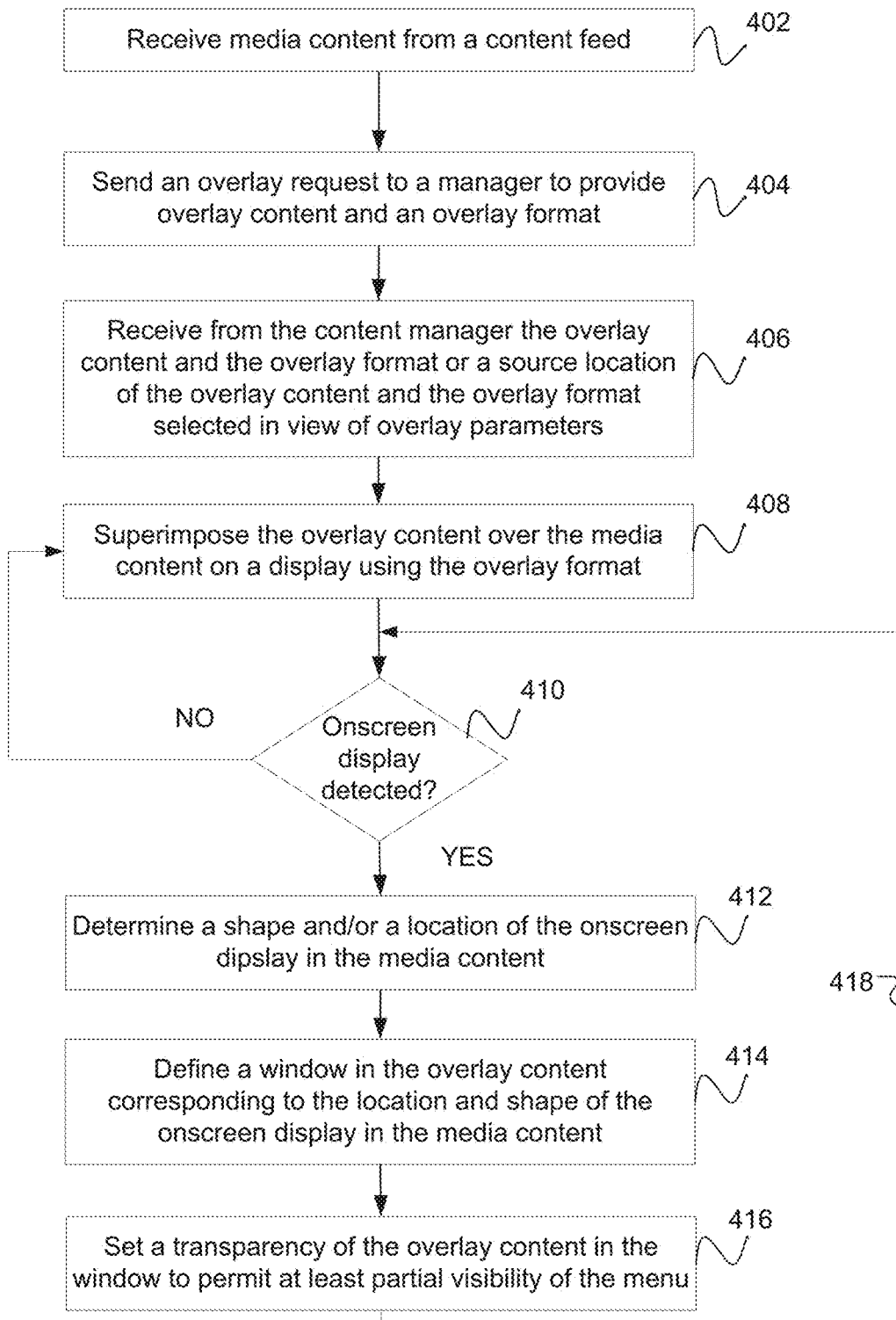
FIG. 4 illustrates a flowchart of a method for overlaying content on media content with a window to permit at least partial visibility of an onscreen display on the media content through the overlaying advertisements according to one embodiment.

FIG. 4 illustrates a flowchart of a method 400 for overlaying content on media content with a window to permit at least partial visibility of an onscreen display on the media content through the overlaying advertisements according to one embodiment. The method 400 may be at least partially performed by processing logic that may include hardware (e.g., circuitry, dedicated logic, programmable logic, microcode, etc.), software (e.g., instructions executed by a processing device), firmware or a combination thereof. The method 400 may be performed by processing logic of a client device or a server device. Alternatively, the method 400 may be performed by other processing devices in various types of user device, portable devices, televisions, projectors, or other media devices.

Referring to FIG. 4, the processing logic can begin with receiving media content from a content feed (402). The processing logic can send an overlay request to a management system to provide overlay content and an overlay format (404). The processing logic can receive from the content manager the overlay content and the overlay format or a source location of the overlay content and the overlay format selected in view of overlay parameters (406). The processing logic can superimpose the overlay content over the media content on a display using the overlay format (408). The processing logic can determine whether there is an onscreen display overlayed on the media content or integrated into the media content (410).

In one example, to determine whether there is an onscreen display present in the media content, the processing device can detect when an unrecognized object, such as an obstruction or an onscreen display, may be displayed on the media consumption device. For example, video can be fingerprinted by an ACR fingerprinter so that when the video may be displayed on a media consumption device, the video sequence can be used to identify content of the video. The video played on a media consumption device can have an obstruction displayed over the media content. In one embodiment, the obstruction can be a mark in the video, such as a logo or watermark, that has been inserted into the video image. In another embodiment, the obstruction can be an onscreen display, such as a volume indicator or a programming guide. When the video includes obstructions, the ACR fingerprinter may not recognize images of the video or may have a reduced content detection accuracy level or identification accuracy level. When the video becomes unrecognizable or the content detection accuracy level decreases below a threshold accuracy level, the ACR fingerprinter may assume that there is an obstruction and an obstruction detecting fingerprint algorithm can be used to recognize the content and a location and size of the obstruction.

The obstruction detecting fingerprint algorithm may have hash values that represent rows and columns in a video frame of the video. The number of rows and columns may vary based on how accurate an ACR fingerprinter may be set to detect an obstruction. The ACR fingerprinter can test source hash values for each row and column of the video frame independently. When there is an obstruction in the video frame, the rows and columns of the video frame that are not obstructed can match rows and columns of a source video. The rows and columns that do not match can define where the obstruction may be located. In one example, the rows and columns that do no match can define a predefined shape, such as a rectangle, associated with an onscreen display. In another example, when the rows and columns that do not match do not define a rectangle, the video may not include an obstruction in the video frame, but rather a video or image from a different source. In another example, when the video image may not be the same as video images of the source video, then many or all of the hash values for the rows and columns may not match.

In one embodiment, the hashing of the rows and columns can be done consecutively. In another embodiment, every nth row and nth column can be hashed. In one embodiment, the n in nth can represent a number in a series of rows and columns of the columns or rows in the video image. For example n can represent hashing such as every odd row and column or every even row and column. In another embodiment, every row and column can be hashed for every nth frame of media content. For example, when n is equal to 3, every row and column can be looked at over 3 different frames. For example, for a first frame, a first ⅓ of the first frame can be hashed. In this example, for the second frame, a second ⅓ of the second frame can be hashed and for a third frame, a third ⅓ of the third frame can be hashed. This would give it row and column level accuracy to identify an onscreen display within 1 column and 1 row when looking at 3 frames in a sequence. In another example, the nth row can be different from the nth column. For example, the $2^{nd}$ row and the $3^{rd}$ column can be hashed. In another example, different sets of rows and columns can be hashed for different frames. For example, the algorithm can cycle through the different rows and columns to use from frame to frame. An advantage of hashing every nth row and column can be to reduce a size of the data per frame to be hashed.

In one embodiment, to reduce a size of area for fingerprinting or an amount of processing power used to compare fingerprints, the ACR fingerprinter may spread the hash values for the rows and columns across multiple frames. For example, the ACR fingerprinter may reduce a size of area for fingerprinting by 50% by only using odd rows and columns on one video frame and then using even rows and columns on another video frame. An advantage of reducing the size of area for fingerprinting can be to reduce a processing power and processing time for the ACR fingerprinter while maintaining a row and column level accuracy with in two frames of comparison. The number or sequence of frames used in the preceding paragraphs is not intended to be limiting, e.g., the ACR fingerprinting for obstruction detection can use any number of frames (or skip any number of frames or portions of the frames) to reduce the fingerprint size.

In another example, the processing logic can access or maintain a database or list of a size, shape, and screen location of various onscreen displays for different media consumption devices or devices that can be coupled to the different media consumption devices. In this example, the processing device can determine a type of a different media consumption device or a device coupled to the media consumption device and detect when an onscreen display may be displayed on the media consumption device. The processing device can determine a type of the onscreen display and look up a size, shape, and screen location of the onscreen display by finding information associated with the type on the onscreen display for the media consumption device or the device coupled to the media consumption device. As discussed in the proceeding paragraphs, when the size, shape, or screen location of the onscreen display may be determined, an opacity level of a layer for the location of the onscreen display may be adjusted to enable a viewer to at least partially view the onscreen display.

When the processing logic detects a presence of an onscreen display in the media content, the processing logic can determine a shape and a location of the onscreen display in the media content (412). The processing logic can define a window in the overlay content that corresponds to the location and shape of the onscreen display in the media content (414). The processing logic can set a transparency level of the overlay content in the window to permit the onscreen display in the media content to be at least partially visible through the overlay content (416). The processing logic can iteratively determine whether the onscreen display is still detected (418).

Figure 5:
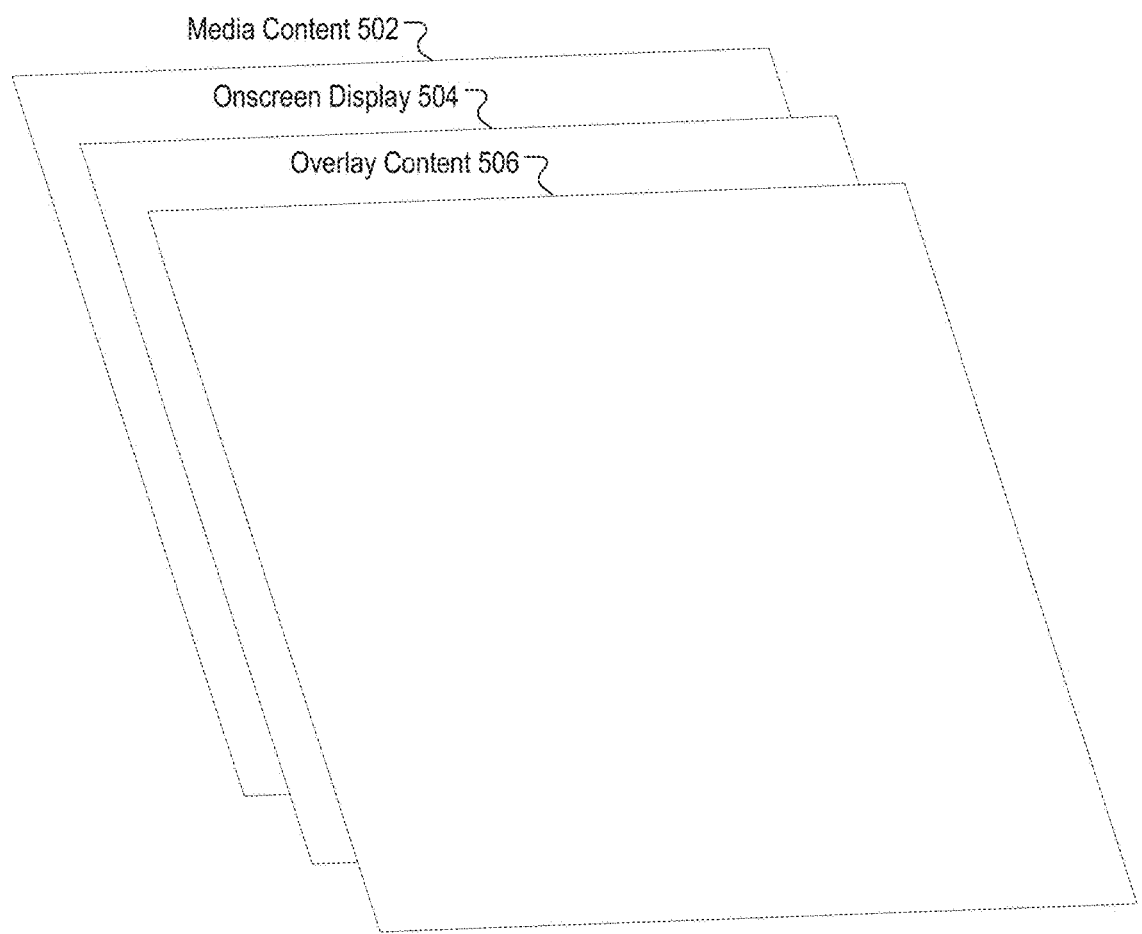
FIG. 5 illustrates a compositing of media content, an onscreen display, and overlay content to create an image to display on a media consumption device according to one embodiment.

FIG. 5 illustrates a compositing of media content 502, an onscreen display 504, and overlay content 506 to create an image to display on a media consumption device according to one embodiment. Compositing can be a technique of creating a display image by stacking two or more videos or graphics on multiple tracks, such as the broadcast content 502, the onscreen display 504, and the overlay content 506. A processing device can blend the videos or graphics together into one image. In one embodiment, each track can be a layer. In one example, the highest layer or top layer, such as the overlay content 506, can be the most dominant layer, e.g., the layer that may be displayed in front of other layers. In one example, the overlay content 506 can cover up the media content 502 (e.g., a lowest layer or bottom layer) and the onscreen display 504 (e.g., a middle layer). In this example, the onscreen display 504 can cover up the media content 502.

The layers of an image may be received and composited at one or more devices. In one embodiment, the media content 502 can be stored or exist on a first device and can be sent to a second device via a communication channel, such as via a high definition multimedia interface (HDMI) channel or other communication channels. The second device can composite the received media content 502 with the onscreen display 504 and the overlay content 506 and display the final composite image.

In another embodiment, the media content 502 and the onscreen display 504 can be stored or exist on the first device and can be composited by the first device before being sent to the second device via the communication channel. The second device can composite the received media content 502 and onscreen display 504 with the overlay content 506 before displaying the final composite image. In another embodiment, the media content 502, onscreen display 504 and overlay content 506 may all be stored or exist on a single device, where the single device can composite the media content 502, onscreen display 504 and overlay content 506 before displaying the composite image.

Compositing can include changing an opacity or transparency of at least a portion of one or more layers of a composite image. For example, compositing can include altering opacity of a portion of the overlay content 506 (e.g., the dominant layer) so that a viewer can see part of the onscreen display 504 that is under or behind the overlay content 506. As discussed in the preceding paragraphs referring to 414 and 416 of FIG. 4, the processing logic can define a window in the overlay content that corresponds to the location and shape of the onscreen display in the media content. The processing logic can use a compositing technique of changing an opacity or transparency of the overlay content in the window to permit the onscreen display 504 to be at least partially visible through the overlay content 506.

Figure 6A:
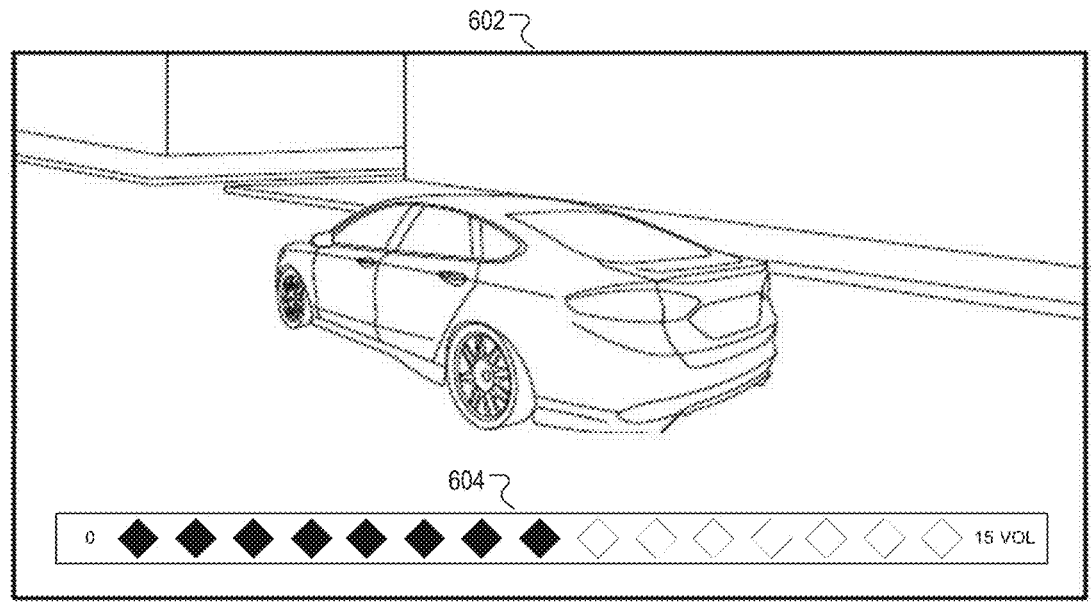
FIG. 6A illustrates the media content as a first layer and the onscreen display as a second layer above the media content according to one embodiment.
Figure 6B:
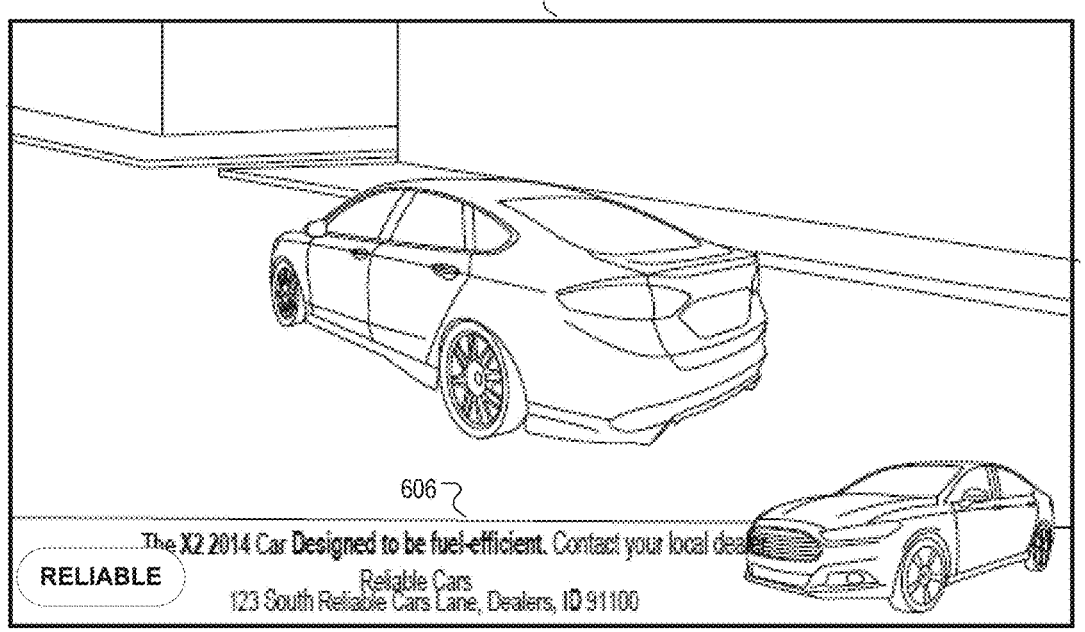
FIG. 6B illustrates the media content as the first layer with the overlay content as a third layer above the media content and the onscreen display according to one embodiment.
Figure 6C:
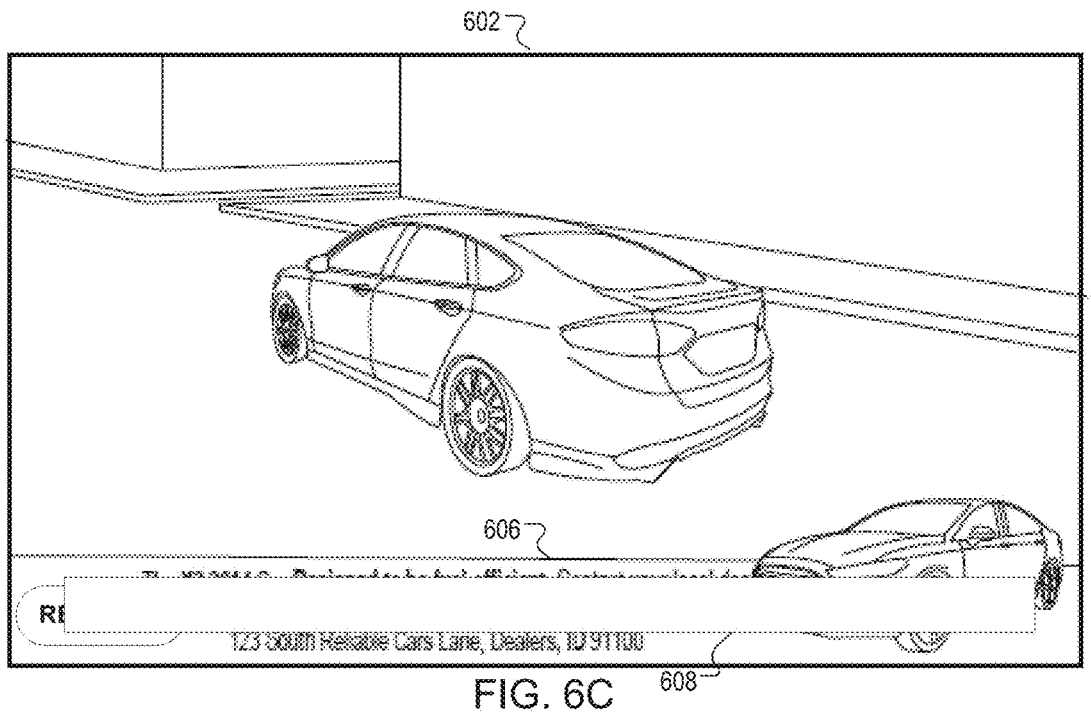
FIG. 6C illustrates the media content with the overlay content that includes the opacity window, where the opacity window is a variable-transparency window that can be a window to display layers beneath the overlay content to a viewer according to one embodiment.
Figure 6D:
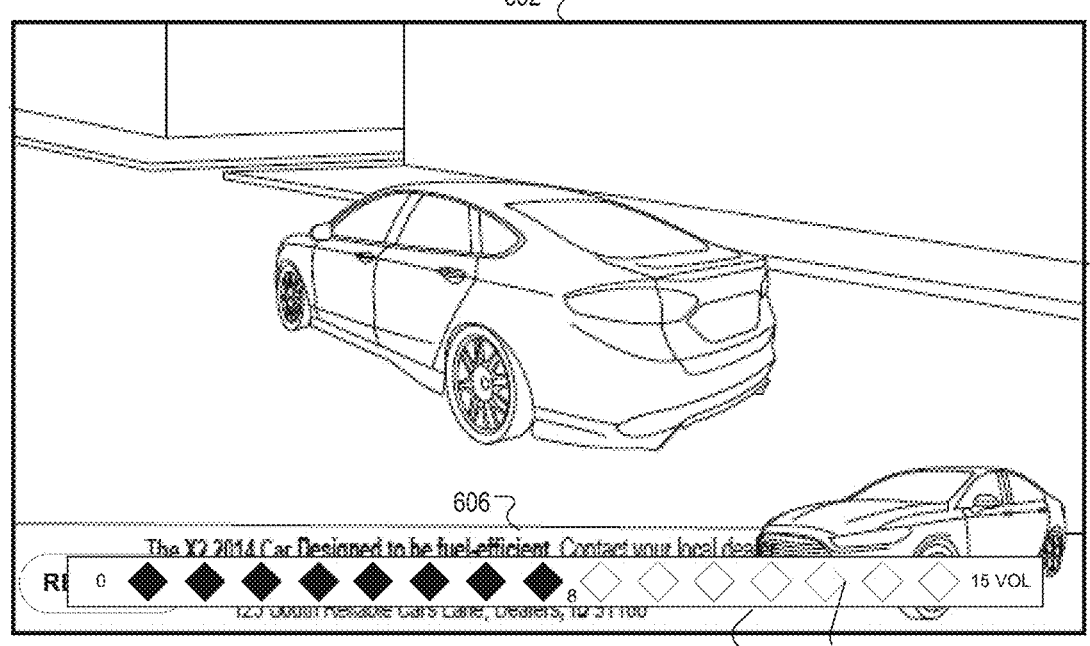
FIG. 6D illustrates the media content with the overlay content, where the opacity window is set to a threshold opacity level to show the onscreen display behind the overlay content according to one embodiment.

FIGS. 6A-6D illustrate a composite image of media content 602, an onscreen display 604, and overlay content 606 with a opacity window 608 according to one embodiment. Specifically, FIG. 6A illustrates the media content 602 as a first layer and the onscreen display 604 (e.g., a volume level indicator) as a second layer above the media content 602. FIG. 6B illustrates the media content 602 as the first layer with the overlay content 606 as a third layer above the media content 602 and the onscreen display 604. FIG. 6C illustrates the media content 602 with the overlay content 606 that includes the opacity window 608, where the opacity window 608 is a variable-transparency window that can be a window to display layers beneath the overlay content 606 to a viewer. FIG. 6D illustrates the media content 602 with the overlay content 606, where the opacity window 608 is set to a threshold opacity level to allow the onscreen display 604 behind the overlay content 606 to be viewable through the overlay content.

Figure 7A:
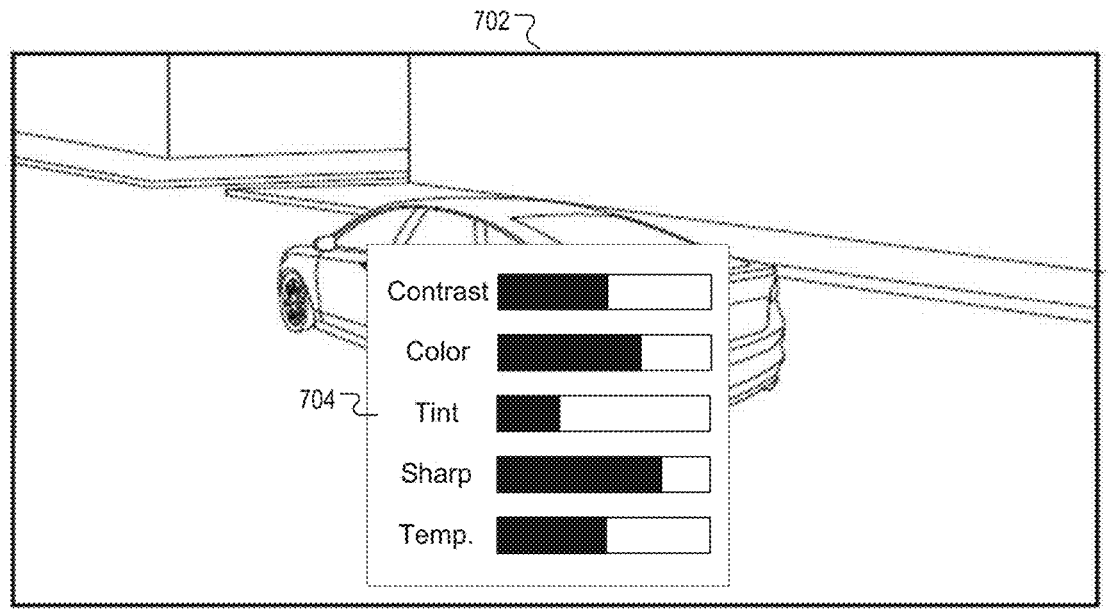
FIG. 7A illustrates the media content as a first layer and the onscreen display as a second layer above the media content according to one embodiment.
Figure 7B:
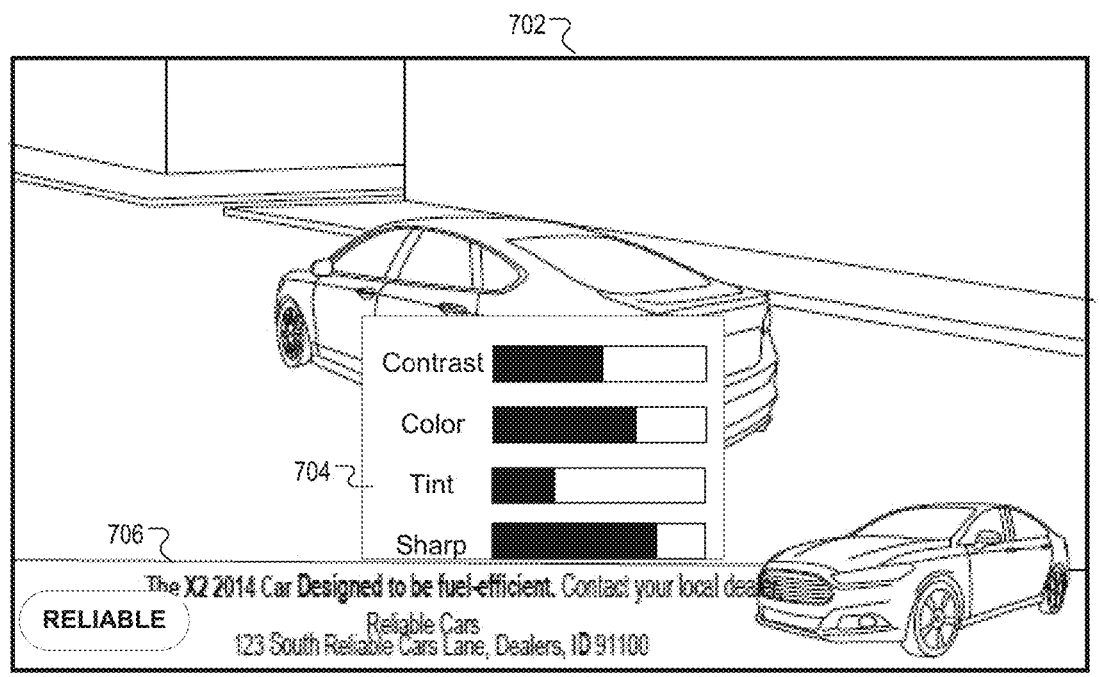
FIG. 7B illustrates the media content as the first layer with the overlay content as a third layer above the broadcast content and the onscreen display according to one embodiment.

FIGS. 7A-7F illustrate a composite image of media content 702, an onscreen display 704, and overlay content 706 with a opacity window 708 according to one embodiment. Specifically, FIG. 7A illustrates the media content 702 as a first layer and the onscreen display 704 (e.g., a device controls menu) as a second layer above the media content 702. FIG. 7B illustrates the media content 702 as the first layer with the overlay content 706 as a third layer above the broadcast content 702 and the onscreen display 704. As illustrated in FIG. 7B, the third layer can cover up a portion of a viewable area of the media content 702 (e.g., a portion of a display screen or less than the full display screen). For example, the overlay content 706 is overlapping a portion of the onscreen display 704 such that the onscreen display is partially covered (the "Temp." data bar is not seen).

Figure 7C:
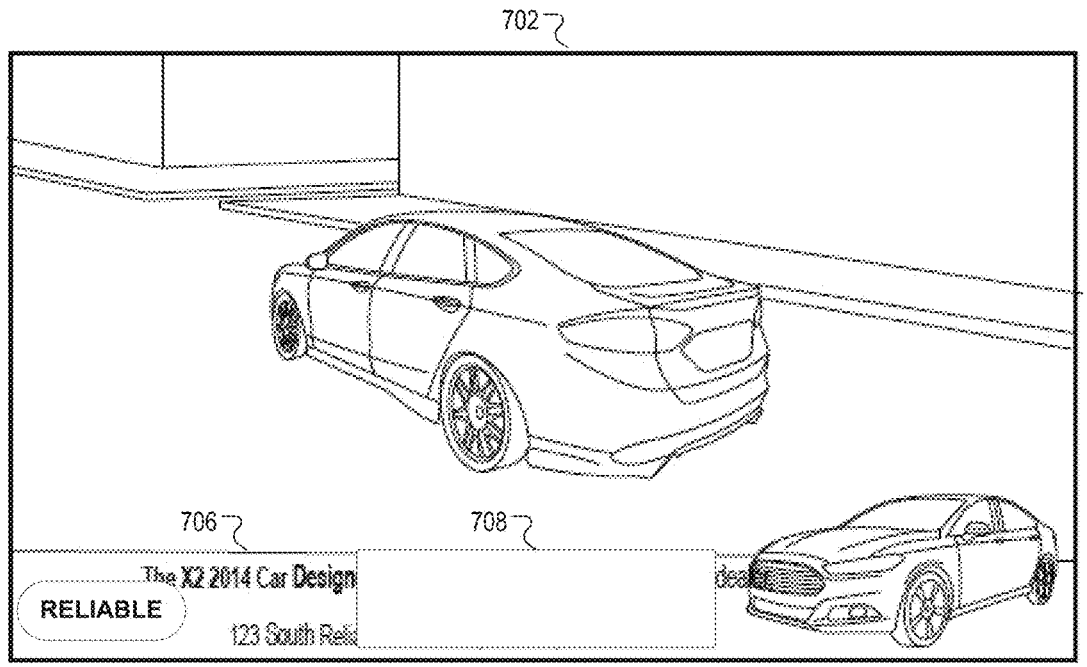
FIG. 7C illustrates the media content with the overlay content that includes the opacity window according to one embodiment.
Figure 7D:
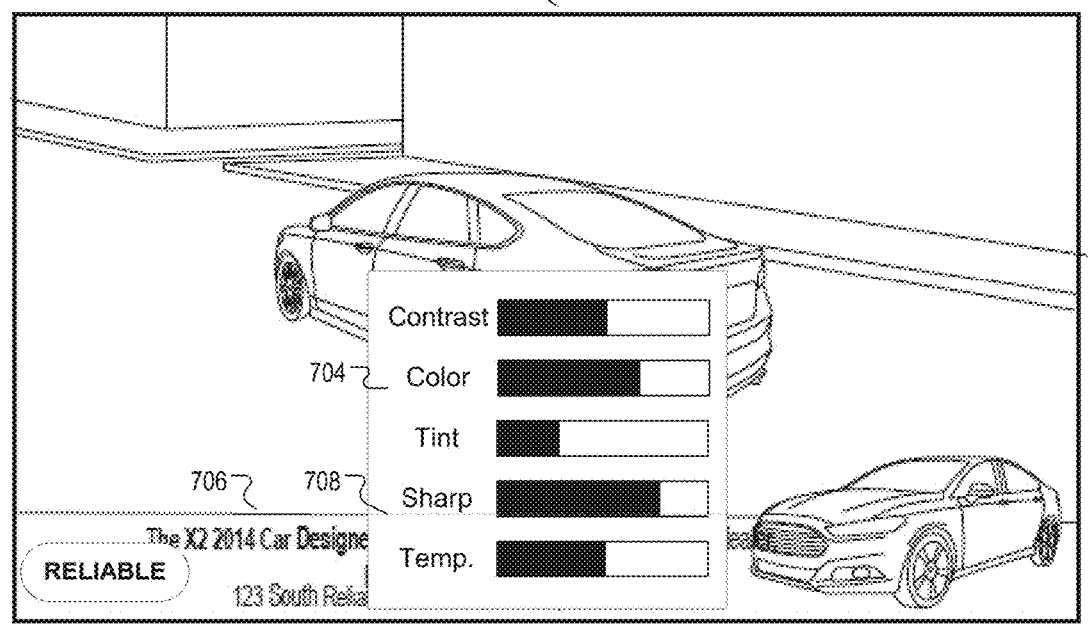
FIG. 7D illustrates the broadcast content with the overlay content according to one embodiment.

FIG. 7C illustrates the media content 702 with the overlay content 706 that includes the opacity window 708, where the opacity window 708 is a variable-transparency window that can be a window to display layers beneath the overlay content 706 to a viewer. Note that the opacity window 708 can be located within the overlay content and can be a different size or shape than the onscreen display 704. FIG. 7D illustrates the broadcast content 702 with the overlay content 706, where the opacity window 708 is set to a threshold opacity level to show the onscreen display 704 that is positioned behind the overlay content 706. As illustrated in FIG. 7D, the overlay content 706 may only obscure a portion of the onscreen display 704 and the opacity window 708 can be a window within the overlay content 706 that allows the portion of the onscreen display 704 that is covered or obscured by the overlay content 706 to be viewable through the overlay content 706.

Figure 7E:
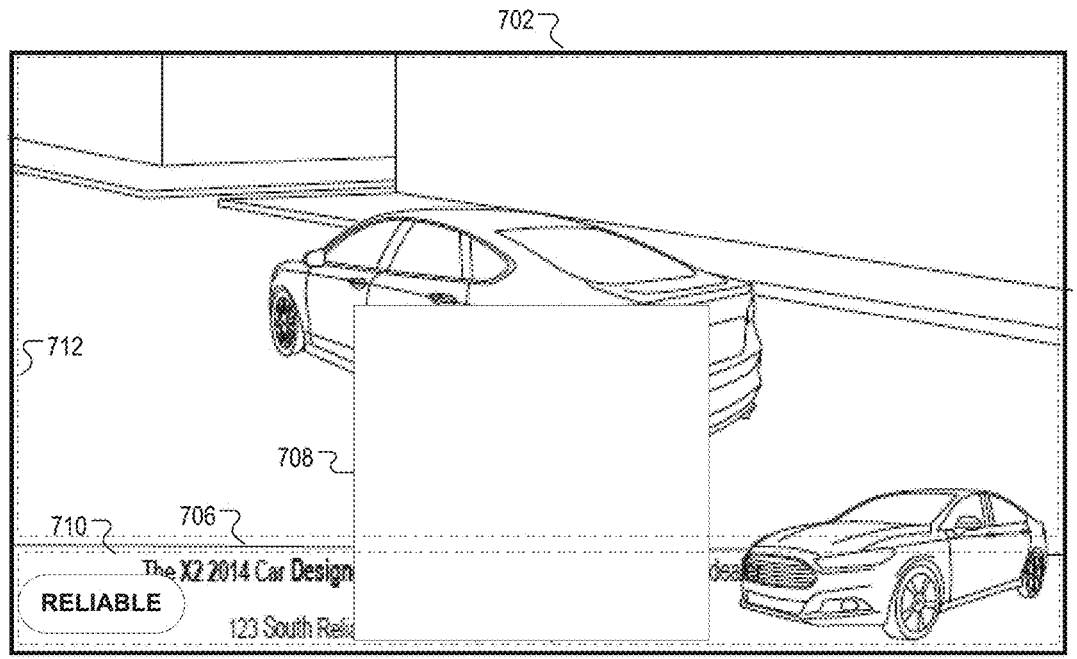
FIG. 7E illustrates a first portion and a second portion of the third layer.

In another embodiment, the third layer can cover the entire viewable area of the media content 702 (e.g., the full display screen). FIG. 7E illustrates a first portion 710 and a second portion 712 of the third layer. The first portion 710 of the third layer can be the overlay content 706 that displays content over the media content 702 and the second portion 712 of the third layer can be a fully transparent portion. The second portion 712 does not further block a part of the media content 702 (e.g., the media content 702 not covered by the overlay content 706).

Figure 7F:
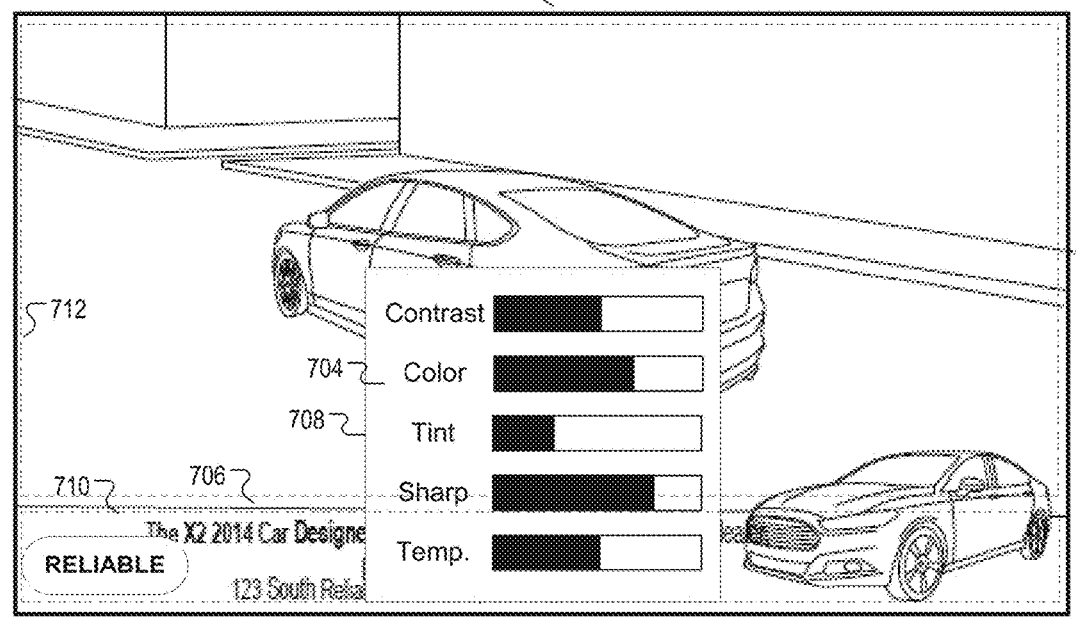
FIG. 7F illustrates that the opacity window is a same size as the onscreen display.

FIG. 7F illustrates that the opacity window 708 is a same size as the onscreen display 704. The opacity window 708 can include a part of the first portion 710 and part of the second portion 712 of the third layer. An advantage of the third layer covering the entire viewable area of the media content 702 and the opacity window 708 being the same size as the onscreen display 704 can be that the onscreen display 704 can remain viewable when the overlay content 706 changes a shape or size. For example, as discussed with reference to FIGS. 9A and 9B, the size and shape of the overlay content can change from covering part of the viewable area in FIG. 9A to covering the entire viewable area in FIG. 9B. In this example, when the opacity window 708 is the same size as the onscreen display 704, then the entire onscreen display remains viewable when the overlay content 706 changes size or shape. In another embodiment, the opacity window 708 can dynamically change shape or size in response to changes in a size or shape of the overlay content 706.

In one embodiment, the management system 100 (FIG. 1) can select different overlay formats based on a content of the local content feed or user information received from the client device. In another example, the overlay format information can include: an expanding overlay format; a synchronized overlay format; a template overlay format; a sequenced overlay format (e.g., different overlay content is a sequence); a video format, e.g., displaying alternate video content to the media content being played in an underlying broadcast by displaying an alternate video that targets interests of a user of the client device; or a microsite format.

FIGS. 6A-6D and 7A-7D illustrates a template overlay format for an overlay superimposed on media content. The template overlay can be created and populated with personalized or localized information by matching overlay request parameters with external data.

FIG. 8 illustrates an expanding overlay format 800 for an overlay content 806 superimposed on a media content 802 according to one embodiment. The overlay content 806 can include an opacity window 808 (the left-most portion up to the dashed lines) so that the onscreen display 804 can be viewable. In one example, the expanding overlay format 800 can enable a user to press a button on an input device (such as a remote control) and trigger the overlay to show more information.

Figure 9A:
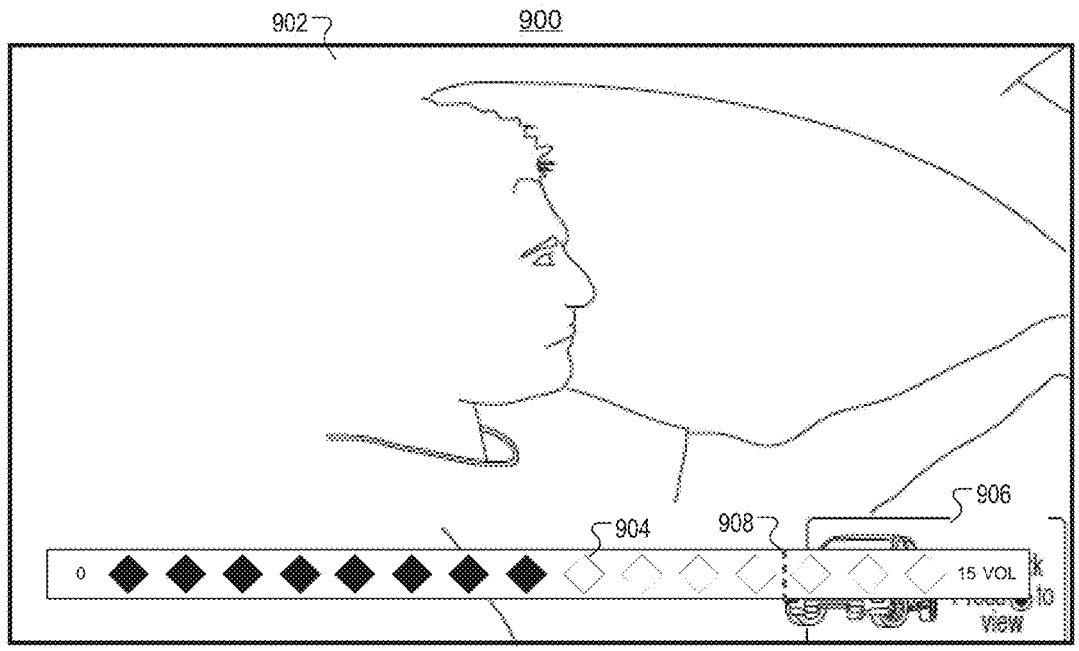
FIG. 9A illustrates a microsite overlay format for an overlay content superimposed on a media content according to one embodiment

FIG. 9A illustrates a microsite overlay format 900 for an overlay content 906 superimposed on a media content 902 according to one embodiment. The overlay content 906 can include an opacity window 908 (the right-most portion up to the dashed lines) so that the onscreen display 904 can be viewable. Microsite overlays can enable a viewer to go from an overlay to a full screen experience.

Figure 9B:
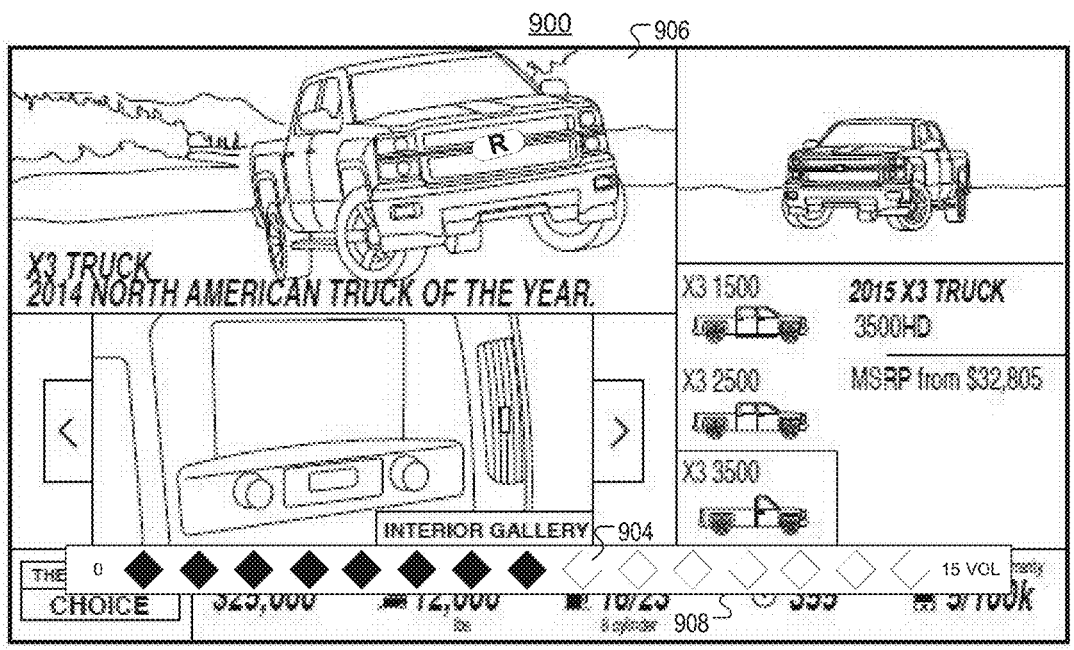
FIG. 9B illustrates a full screen experience of a microsite overlay format for an overlay content superimposed on a media content according to one embodiment

FIG. 9B illustrates a full screen experience of a microsite overlay format 900 for an overlay content 906 superimposed on a media content 902 according to one embodiment. In one example, the broadcast content 902 can be dismissed when the overlay content 906 is in a full screen mode. In another example, the media content can be shown as a Picture-in-Picture (PiP) while the overlay content is displayed on the remainder of the screen.

Figure 10:
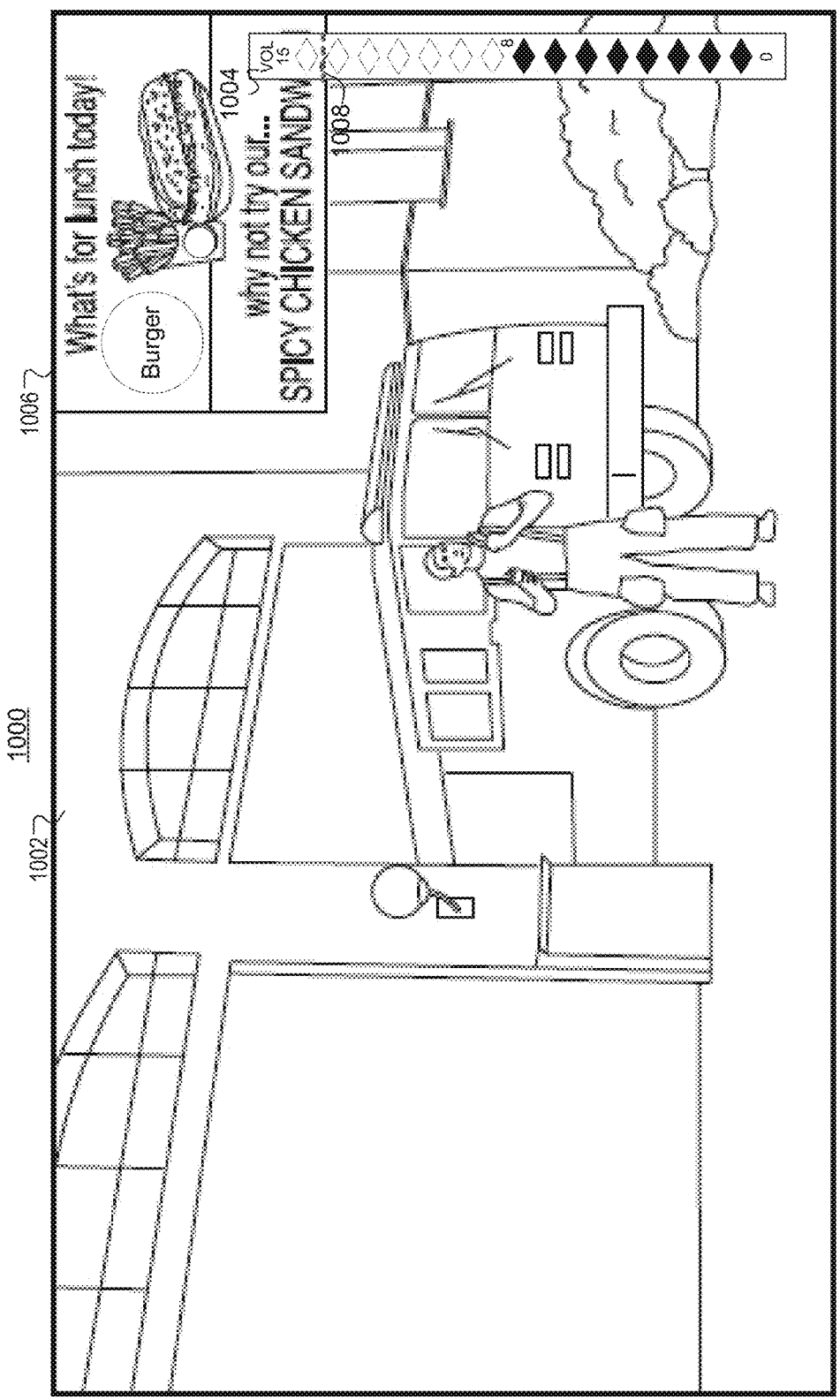
FIG. 10 illustrates an overlay content superimposed on a corner of broadcast content according to one embodiment.

FIG. 10 illustrates an overlay content 1006 superimposed on a corner of broadcast content 1002 according to one embodiment. The overlay content 1006 can include an opacity window 1008 (the top-most portion up to the dashed lines) in the corner of the media content 1002. The illustrations of the overlay formats in the proceeding paragraphs are exemplary illustrations of overlay formats. A format or location of the media content, overlay content, opacity window, and/or onscreen display can have a variety of formats and be located at a variety of locations on a display.

Figure 11:
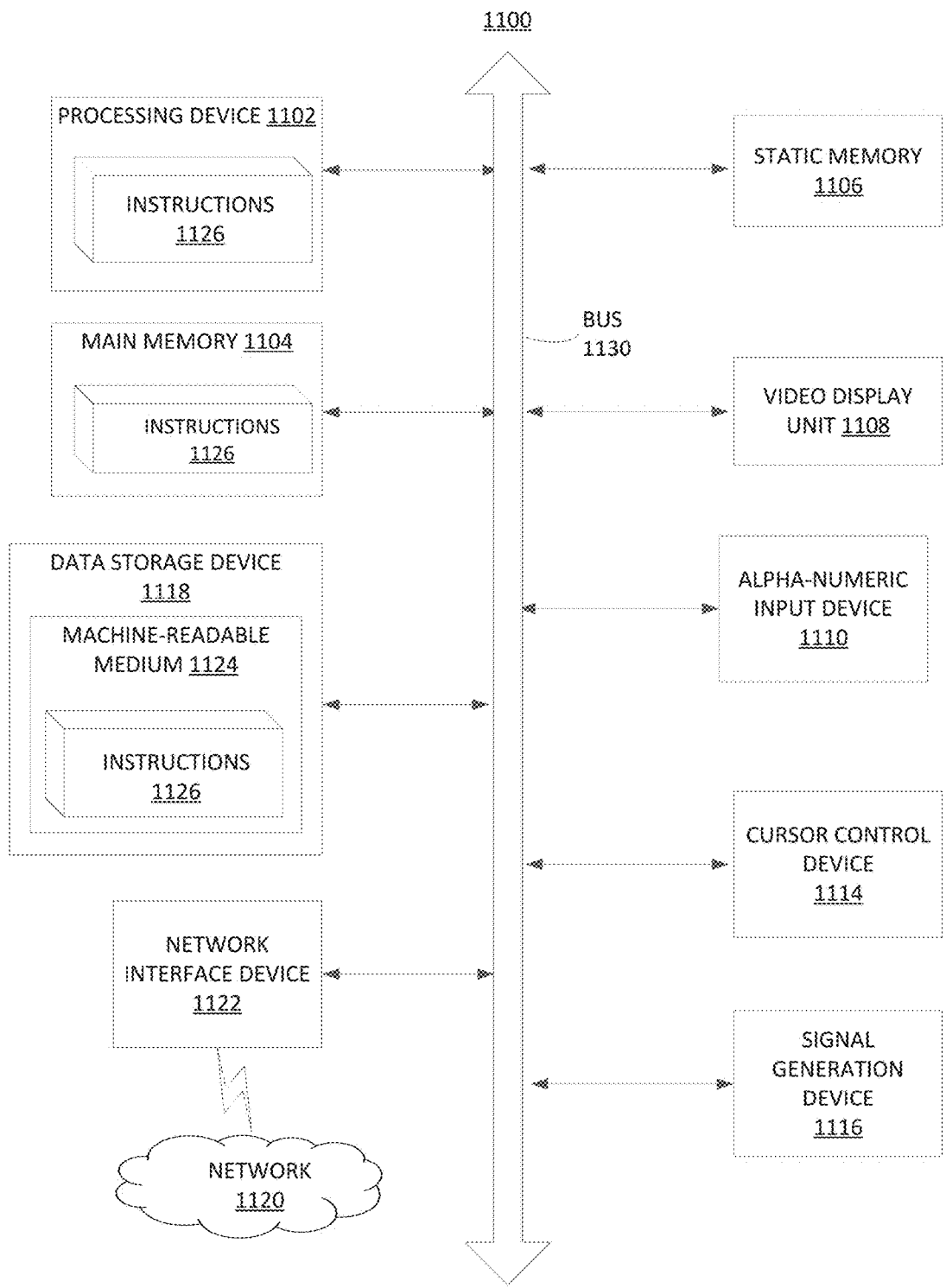
FIG. 11 illustrates a diagrammatic representation of a machine in the example form of a computer system within which a set of instructions, for causing the machine to perform any one or more of the methodologies discussed herein, may be executed.

FIG. 11 illustrates a diagrammatic representation of a machine in the example form of a computer system or a server device 1100 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1100 may correspond to the processing device 130 of FIG. 1 or to the processing device 230 of FIG. 2. The computer system 1100 may correspond to at least a portion of a cloud-based computer system.

The computer system 1100 includes a processing device 1102, a main memory 1104 (e.g., read-only memory (ROM), flash memory, dynamic random access memory (DRAM) (such as synchronous DRAM (SDRAM) or DRAM (RDRAM), etc.), a static memory 1106 (e.g., flash memory, static random access memory (SRAM), etc.), and a data storage device 1118, which communicate with each other via a bus 1130.

Processing device 1102 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. In one embodiment, processing device 1102 may include one or more processing cores. The processing device 1102 may execute the instructions 1126 of a mirroring logic for performing the operations discussed herein.

The computer system 1100 may further include a network interface device 1108 communicably coupled to a network 1120. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), a signal generation device 1116 (e.g., a speaker), or other peripheral devices. Furthermore, computer system 1100 may include a graphics processing unit 1122, a video processing unit 1128, and an audio processing unit 1132. In another embodiment, the computer system 1100 may include a chipset (not illustrated), which refers to a group of integrated circuits, or chips, that are designed to work with the processing device 1102 and controls communications between the processing device 1102 and external devices. For example, the chipset may be a set of chips on a motherboard that links the processing device 1102 to very high-speed devices, such as main memory 1104 and graphic controllers, as well as linking the processing device 1102 to lower-speed peripheral buses of peripherals, such as USB, PCI or ISA buses.

The data storage device 1118 may include a computer-readable storage medium 1125 on which is stored instructions 1126 embodying any one or more of the methodologies of functions described herein. The instructions 1126 may also reside, completely or at least partially, within the main memory 1104 and/or within the processing device 1102 during execution thereof by the computer system 1100; the main memory 1104 and the processing device 1102 also constituting computer-readable storage media.

The computer-readable storage medium 1125 may also be used to store instructions 1126 utilizing logic and/or a software library containing methods that call the above applications. While the computer-readable storage medium 1125 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions 1126 for execution by the machine and that cause the machine to perform any one or more of the methodologies of the present disclosure. The term "computer-readable storage medium" shall accordingly be taken to include, but not be limited to, solid-state memories, optical media, and magnetic media. The following examples pertain to further embodiments.

While the present invention has been described with respect to a limited number of embodiments, those skilled in the art will appreciate numerous modifications and variations therefrom. It is intended that the appended claims cover all such modifications and variations as fall within the true spirit and scope of this present invention.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present invention.

The embodiments are described with reference to secure memory repartitioning in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that may perform the functions and operations taught below. It is described that the system may be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present invention may be applied to other types of circuits or semiconductor devices that may benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and may be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Although the below examples describe instruction handling and distribution in the context of execution units and logic circuits, other embodiments of the present invention may be accomplished by way of a data or instructions stored on a machine-readable, tangible medium, which when performed by a machine cause the machine to perform functions consistent with at least one embodiment of the invention. In one embodiment, functions associated with embodiments of the present invention are embodied in machine-executable instructions. The instructions may be used to cause a general-purpose or special-purpose processor that is programmed with the instructions to perform the steps of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, operations of embodiments of the present invention might be performed by specific hardware components that contain fixed-function logic for performing the operations, or by any combination of programmed computer components and fixed-function hardware components.

Instructions used to program logic to perform embodiments of the invention may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as may be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein may be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A device comprising:
    a receiver to receive media content from a content feed; and
    a processing device coupled to the receiver, the processing device to:
        send, to a content manager, an overlay request to provide overlay content and an overlay format, wherein the overlay request comprises an overlay parameter;
        receive, from the content manager, the overlay content and the overlay format selected in view of the overlay parameter;
        superimpose the overlay content over the media content using the overlay format;
        detect a presence of an onscreen display positioned between the media content and the overlay content, wherein the media content is a bottom layer that includes a first set of pixels, the onscreen display is a middle layer that includes a second set of pixels, and the overlay content is a top layer that includes a third set of pixels;
        determine a shape and a location of a portion of the onscreen display that extends underneath the overlay content;
        define a portion of the third set of pixels as a window in the overlay content that corresponds to at least the location and shape of the portion of the onscreen display that extends underneath the overlay content; and
        set a transparency level of the portion of the third set of pixels to permit a portion of the second set of pixels to be at least partially visible through the window, wherein the second set of pixels and the third set of pixels are separate sets of pixels maintained at the middle layer and the top layer, respectively.

2. The device of claim 1, wherein the processing device is further to:
    receive an online source location of the overlay content and the overlay format; and
    retrieve the overlay content and the overlay format from the online source location.

3. The device of claim 1, further comprising a display screen, wherein the processing device is further to display the overlay content over the media content on the display screen.

4. The device of claim 1, wherein the transparency level is set to full transparency and wherein the portion of the onscreen display is an entirety of the onscreen display.

5. The device of claim 1, wherein the onscreen display comprises at least one of a volume level indicator, a menu, or a programming guide executable by the processing device or by a computing device coupled to the receiver.

6. A non-transitory computer-readable storage medium comprising executable instructions that, when executed by a processing device, cause the processing device to:
    receive media content from a content feed;
    send, to a content manager, an overlay request to provide overlay content;
    receive the overlay content;
    superimpose the overlay content over the media content;
    detect a presence of an onscreen display positioned between the media content and the overlay content, wherein the media content is a bottom layer that includes a first set of pixels, the onscreen display is a middle layer that includes a second set of pixels, and the overlay content is a top layer that includes a third set of pixels;
    determine, by the processing device, a location of a portion of the onscreen display that extends underneath the overlay content;
    define a portion of the third set of pixels as a window in the overlay content that corresponds to at least the location of the portion of the onscreen display; and
    set a transparency level of the portion of the third set of pixels to permit a portion of the second set of pixels to be at least partially visible through the window, wherein the second set of pixels and the third set of pixels are separate sets of pixels maintained at the middle layer and the top layer, respectively.

7. The non-transitory computer readable storage medium of claim 6, wherein the executable instructions are further to cause the processing device to determine a size of the onscreen display over the media content.

8. The non-transitory computer-readable storage medium of claim 7, wherein to determine the location and the size of the onscreen display further comprises to:
    detect an unrecognized object superimposed over the media content;
    identify a location and a size of the unrecognized object; and
    designate the unrecognized object as the onscreen display.

9. A non-transitory computer-readable storage medium comprising executable instructions that, when executed by a processing device, cause the processing device to:
    receive media content from a content feed;

send, to a content manager, an overlay request to provide overlay content;
receive the overlay content;
superimpose the overlay content over the media content;
detect a presence of an onscreen display positioned between the media content and the overlay content;
generate fingerprints of the media content;
identify the media content using the fingerprints;
determine a location and a size of an obstruction in the media content, wherein the obstruction is at least a portion of the media content with no overlap with the fingerprints;
designate the obstruction as the onscreen display;
define a window in the overlay content that corresponds to at least the location of the onscreen; and
set a transparency level of the overlay content in the window to permit the portion of the onscreen display to be at least partially visible through the overlay content.

10. a non-transitory computer-readable storage medium comprising executable instructions that, when executed by a processing device, cause the processing device to:
receive media content from a content feed;
send, to a content manager, an overlay request to provide overlay content;
receive the overlay content;
superimpose the overlay content over the media content;
detect a presence of an onscreen display positioned between the media content and the overlay content;
generate fingerprints of the media content;
identify the media content using the fingerprints;
determine an identification accuracy level of a portion of the media content;
determine that the identification accuracy level of the portion is below a threshold level;
designate the portion as the onscreen display;
define a window in the overlay content that corresponds to at least the location of the portion of the onscreen display; and
set, by the processing device, a transparency level of the overlay content in the window to permit the portion of the onscreen display to be at least partially visible through the overlay content.

11. The non-transitory computer-readable storage medium of claim 10, wherein to identify the media content using the fingerprints further comprises to:
hash rows and columns of a first image to determine first hash values of the media content;
hash rows and columns of a second image to determine second hash values for the second image of the onscreen display;
compare the second hash values to the first hash values;
identify one or more of the second hash values that do not match the first hash values; and
determine a location associated with the one or more second hash values that do not match with the onscreen display.

12. The non-transitory computer-readable storage medium of claim 11, wherein the rows and columns of the second hash values that do not match define a rectangle where the onscreen display is located in the second image.

13. The non-transitory computer-readable storage medium of claim 6, wherein the executable instructions are further to cause the processing device to display the overlay content over the media content on a display screen of a user device.

14. The non-transitory computer-readable storage medium of claim 6, wherein the executable instructions are further to cause the processing device to:
access a database of onscreen displays for a user device or a second device coupled to the user device;
detect the onscreen display displayed on the user device;
determine a type of the onscreen display;
identify a size, a shape, and a screen location of the onscreen display associated with the type of the onscreen display in the database; and
define the window in the overlay content that corresponds to the size, the shape, and the screen location of the onscreen display.

15. A method comprising:
receiving, by a client device, media content from a content feed;
sending, to a content manager, an overlay request to provide overlay content and an overlay format, wherein the overlay request includes one or more overlay parameters;
receiving, from the content manager, the overlay content and the overlay format selected in view of overlay parameters;
superimposing, by the client device, the overlay content over the media content using the overlay format;
detecting, by the client device, a presence of an onscreen display positioned between the media content and the overlay content, wherein the media content is a bottom layer that includes a first set of pixels, the onscreen display is a middle layer that includes a second set of pixels, and the overlay content is a top layer that includes a third set of pixels;
determining, by the client device, a location of a portion of the onscreen display that extends underneath the overlay content;
defining, by the client device, a portion of the third set of pixels as a window in the overlay content that corresponds to at least the location of the portion of the onscreen display that extends underneath the overlay content; and
setting, by the client device, a transparency level of the portion of the third set of pixels to permit a portion of the second set of pixels to be at least partially visible through the window, wherein the second set of pixels and the third set of pixels are separate sets of pixels maintained at the middle layer and the top layer, respectively.

16. The method of claim 15, further comprising displaying the overlay content over the media content on a display screen of the client device.

17. The method of claim 16, wherein the media content, onscreen display, and the overlay content are layers of an image displayed on the display screen.

18. The method of claim 15, wherein the transparency level is set to a full transparency level.

19. The method of claim 15, wherein the onscreen display is at least one of a volume level indicator, a menu, or a programming guide of the client device or of a computing device coupled to the client device.

20. The method of claim 15, wherein the portion of the onscreen display is an entirety of the onscreen display.

* * * * *